356-400 SR

XR 3,739,247

United States Patent

Yamaguchi et al.

[11] 3,739,247

[45] June 12, 1973

[54] POSITIONING DEVICE USING PHOTOELECTRIC SCANNING

[75] Inventors: Isao Yamaguchi, Nori Kato, both of Tokyo, Japan

[73] Assignee: Canon Kabushiki Kaisha, Tokyo, Japan

[22] Filed: May 10, 1972

[21] Appl. No.: 252,020

[30] Foreign Application Priority Data

| | | |
|---|---|---|
| May 17, 1971 | Japan | 46/33162 |
| Mar. 2, 1972 | Japan | 47/21802 |

[52] U.S. Cl. .................. 318/640, 250/200

[51] Int. Cl. .................. G05d 3/00

[58] Field of Search .................. 318/640; 340/282, 340/146.3 G; 250/201 X, 201 R, 200, 221, 209

[56] References Cited

UNITED STATES PATENTS

| | | | |
|---|---|---|---|
| 3,466,514 | 9/1969 | Brunner | 318/640 |
| 3,457,422 | 7/1969 | Rottman | 318/640 |

*Primary Examiner*—J. D. Miller
*Assistant Examiner*—Harvey Fendelman
*Attorney*—William R. Woodward

[57] ABSTRACT

This specification discloses a positioning device for setting an article in a predetermined position. The article to be positioned by the device has a referential pattern of predetermined shape formed on a surface thereof. The positioning device comprises reference pattern carrier means having a reference pattern whose base portion is substantially similar in shape to the referential pattern of the article. Means is provided to move the article in a plane and to a position where the referential pattern on the article and at least the base portion of the reference pattern are optically superposed one upon the other. The two patterns may be optically superposed by optical means. The superposed images of the two patterns are scanned by photoelectric converter means, which converts such images into electrical signals. Detector means is associated with the photoelectric converter means to detect the extent of deviation between the two patterns in accordance with the outputs from the photoelectric converter means.

21 Claims, 57 Drawing Figures

3739247
OR IN 318/640

POSITIONING DEVICE USING PHOTOELECTRIC SCANNING

BACKGROUND OF THE INVENTION

1. Field of the Invention

This invention relates to a positioning device utilizing the photoelectric scanning, and more particularly to a device for positioning an article by the use of photoelectric scanning.

2. Description of the Prior Art

In the bonding process for assembling transistors or IC (integrated circuit) semiconductor elements or in the pattern printing process for these elements, it is essential to accurately place the semiconductor pellets or wafer patterns in predetermined position. However, placing these minute articles such as semiconductors or the like in a predetermined position with high accuracy has been quite cumbersome even to skilled operators, thus requiring them to acquire a very high degree of skill and long-time practical experiences.

In order to position a semiconductor wafer or other minute article with very high accuracy, it has most often been the practice to use a microscope, place the article to be positioned within the view field of the microscope and displace the article to a predetermined position while viewing it through the microscope. The manufacture of IC elements, particularly the process of printing a predetermined pattern on a semiconductor wafer as the substrate of an IC, will now be described as an example. To position a semiconductor wafer coated with a photoresist layer with respect to a mask provided with a pattern to be printed, an operator places the wafer on a wafer support table and within the view field of a microscope, manually operates adjust dials to displace the support table until a referential mark formed on the wafer is registered with a reference mark formed on the mask, then displaces the microscope outwardly with respect to the semiconductor wafer and moves a printing light source into alignment with the wafer, thereafter turns on the light source to print the predetermined pattern on the mask onto the photoresist layer of the semiconductor wafer. Such a process has required the operator to effect eye-measurement during the positioning operation for each semiconductor wafer, and this has formed a serious bottleneck in the positioning operation. A further difficulty has been encountered in exactly setting the microscope to a predetermined position above the support table during each wafer positioning operation inasmuch as the mechanical accuracy for such purpose is limited. For example, when resetting the microscope to its viewing position, a slight error may occur in the reset position thereof to slightly deviate the optical axis of the microscope, and this gives rise to great difficulties in repeatedly setting semiconductor wafers to a predetermined reference position.

SUMMARY OF THE INVENTION

It is an object of the present invention to eliminate all the foregoing disadvantages existing in the prior art. To achieve this object, the present invention is featurized by forming a referential or standard pattern on an article to be positioned, causing such pattern and a reference pattern similar in shape to be optically superposed one upon the other, converting the images of such superposed patterns into electrical signals, utilizing such signals to represent the extent of deviation of the article from the standard position of the reference pattern, thereby seeking the extent of such deviation in the form of electrical signals.

It is another object of the present invention to convert into electrical signals the extent of deviation of a minute article to be positioned from a predetermined position therefor, and to utilize such signals to accomplish a higher accuracy of positioning.

Other objects and features of the present invention will become fully apparent from the following detailed description taken in conjunction with the accompanying drawings.

DESCRIPTION OF THE PREFERRED EMBODIMENTS

Figure 1:
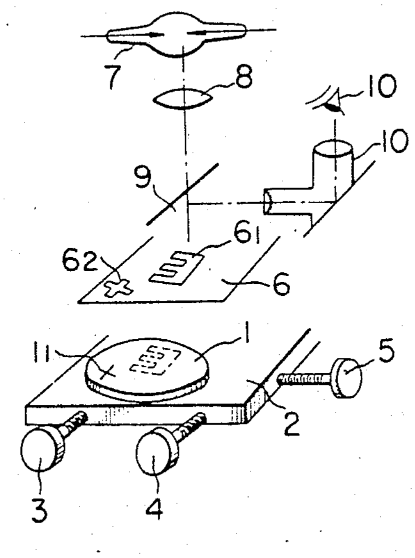
FIG. 1 schematically shows the arrangement of the conventional positioning device.

Referring to FIG. 1, there is shown a conventional system for positioning semiconductor wafers which has been applied in the manufacture of semiconductors.

In FIG. 1, a semiconductor wafer 1 rests on a support table 2 which may be displaced in directions X and Y by means of adjust knobs 3, 4 and 5. Disposed above the support table 2 is a mask 6 having an etched portion $6_1$, and a light source such as lamp 7 overlies the mask 6. Between the mask and the light source are a condenser lens 8 and a half-mirror 9. A viewing microscope is designated by numeral 10.

Figure 2:
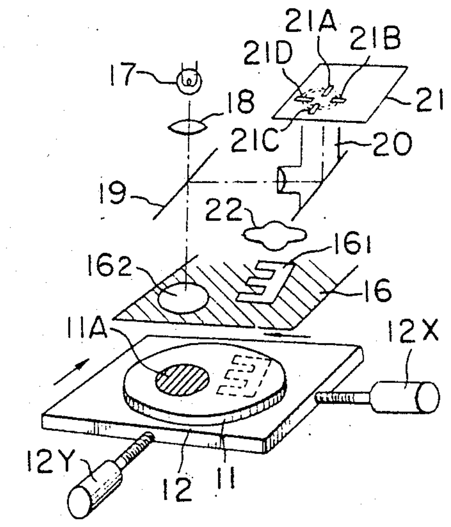
FIG. 2 schematically shows the entire arrangement of the positioning device according to an embodiment of the present invention.

In FIGS. 1 and 2, the semiconductor wafer is shown to an enlarged scale, but the wafer (pattern) is extremely minute.

In order to set the semiconductor wafer 1 in a predetermined position by the use of such device, the operator may operate the adjust knobs 3, 4, 5 on the support table 2 to displace the table 2 as he views through the microscope 10, until a reference mark $6_2$ formed through the mask 6 and a referential mark $1_1$ formed on the semiconductor wafer 1 are registered with each other. Thereafter, the light source 7 may be turned on to project the pattern $6_1$ of the mask 6 upon the surface of the semiconductor wafer 1 so that the pattern is printed on the sensitive layer of the wafer.

In this way, setting the semiconductor wafer in a predetermined position has required the operator to effect his eye-measurement during each positioning operation and this has led to a serious bottleneck in operation.

FIG. 2 shows the optical arrangement in the positioning device of the present invention as applied in the mask pattern printing system for the manufacture of integrated circuits. Herein, the semiconductor wafer is designated by numeral 11 and held on a movable support table 12 which may be displaced in directions X and Y by servomotors 12X and 12Y. The semiconductor wafer 11 is lustrous and has a black circular area 11A formed thereon through the photographic printing. A mask plate 16 overlying the support table has a pattern $16_1$ formed therein for printing a predetermined pattern on the semiconductor wafer and also has a circular opening $16_2$ greater in diameter than the black circle 11A. A light source 17 is provided which does not generate light of photosensitizing wavelength with respect to the photoresist layer for printing the pattern on the semiconductor wafer to be positioned. A condenser lens 18, a half-mirror 19 and an image forming microscope 20 are disposed in the manner similar to FIG. 1. The microscope 20 has its image forming surface 21, a marginal portion of which is formed with slits 21A, 21B, 21C and 21D.

The mask 16 is fixed immovably and the pattern $16_1$ thereon may be printed on the semiconductor wafer 11 when an ultraviolet light source 22 is turned on for printing.

The printing of the pattern $16_1$ is effected on a photoresist layer formed on an insulating layer of silicon dioxide ($SiO_2$) uniformly applied to the semiconductor wafer, and such printing is a step included in the process known as photoetching.

Figure 3:
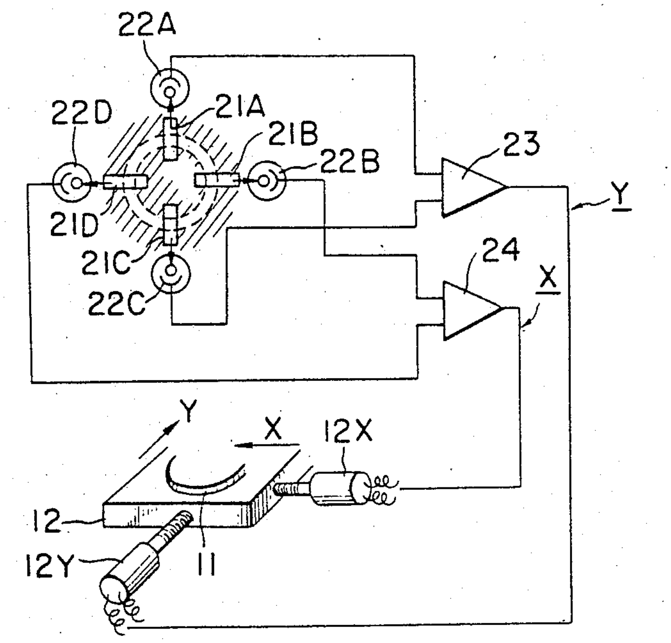
FIG. 3 is a block diagram of the electric circuit in the device of FIG. 2.

As shown in FIG. 3, photoconductive elements such as photoelectric converter cells 22A, 22B, 22C and 22D are disposed in opposed relationship with the respective slits 21A, 21B, 21C and 21D, and the outputs of the cells 22A and 22C are connected with the input of a differential amplifier 23 while the outputs of the cells 22B and 22D are connected with the input of another differential amplifier 24. The outputs of the differential amplifiers 23 and 24 are connected with the servomotors 12X and 12Y, respectively.

Figure 4:
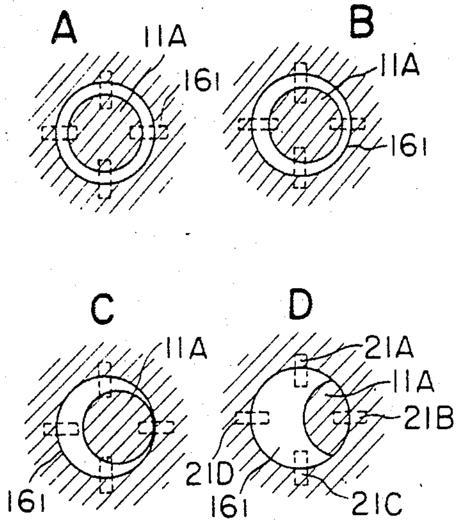
FIG. 4 illustrates the operation of the device shown in FIG. 2.

In such an arrangement, when the light source 17 is turned on prior to printing, light therefrom will be converged by the condenser lens 18 and pass through the opening $16_2$ of the mask 16 to the black area on the semiconductor wafer 11. Since the semiconductor wafer 11 itself is of reflective characteristic, the light beam passed through the opening $16_2$ will be partly absorbed into the black area 11A and the remainder of the light will be reflected by the other part of the wafer. As a result, a pattern will be optically formed on the image forming plate 21 via the half-mirror 19 and microscope 20, in accordance with the position of the semiconductor wafer 11, as shown in FIG. 4. More specifically, FIG. 4A corresponds to the case where the reference opening $16_2$ of the fixed mask 16 is in perfect alignment with the black circle 11A on the wafer 11, and FIGS. 4B, C and D show various cases where there is a misalignment therebetween.

The photoelectric converter cells 22A, 22C and 22B, 22D provided on the marginal portion of the image forming plate 21 where the images of the opening $16_2$ and the wafer's black area 11A are to appear in superposed relationship are connected with the respective differential amplifiers 23 and 24 as mentioned above, and therefore, if the superposed images are not aligned with each other, for example, as shown in FIG. 4D, the resultant output difference between the photoelectric converter cells 22B and 22D associated with the slits 21B and 21D will be applied through the amplifier 24 to drive the servomotor 12X which will cause displacement of the support table 12 in the direction X until the output difference between the two cells 22B and 22D becomes null.

Similarly, in the direction Y, the servomotor 12Y will displace the support table 12 until the output difference between the other photoelectric converter cells 22A and 22C becomes null, and finally the support table 12 will be driven to a position as shown in FIG. 4A where the opening $16_2$ in the mask 16 and the black area 11A on the wafer 11 are in alignment. Subsequently, the light source 17 may be turned off and the ultraviolet light source 22 for printing is turned on to print the pattern $16_1$ of the mask 16 onto the wafer 11, thus completing the printing step.

Figure 5:
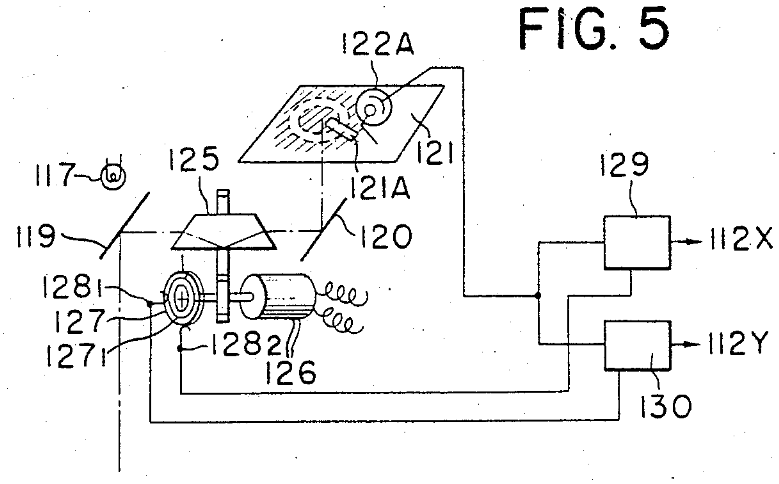
FIG. 5 schematically shows the entire arrangement of the positioning device according to another embodiment of the present invention.

FIG. 5 shows a modified form of the positioning device according to the present invention which differs in the photoelectric light receiving portion from the device shown in FIGS. 2 and 3. More specifically, in FIG. 5, an image forming surface 121 corresponding to that designated by 21 has a single slit 121A formed therethrough, and between the image forming surface 121 and a mirror 119 corresponding to the half-mirror 19 there are provided an image rotator or prism 125, a drive motor 126 for the prism 125, and a rectifier 127 connected with the rotor of the motor 126. The rectifier 127 carries thereon a reference position electrode $127_1$ representing the revolution of the motor 126, and collector electrodes $128_1$ and $128_2$ are provided to successively collect a current from the electrode $127_1$ and apply such current to the input terminals of phase detector circuits 129 and 130, respectively. The outputs of the two circuits 129 and 130 are connected with servomotors 112X and 112Y which correspond to those designated by 12X and 12Y in the previous embodiment.

In the present modification, when the light source 117 is turned on, the images of the mask opening and the black area of the semiconductor wafer will be formed in superposed relationship on the image forming plate 121 via half-mirror $119_1$, prism 125 and mirror 120, in the same manner as described with respect to the previous embodiment. If the two images appear in alignment as shown in FIG. 4A, the output of phototube 122A will produce a signal $L_1$ of constant level as shown in FIG. 6A, as the superposed images on the image forming surface is rotated with the rotation of the prism 125. If the two images are in misalignment as shown in FIG. 4B, C or D, the phototube will produce such an output signal as shown in FIG. 6B, C or D. On the other hand, the rotation of the prism 125 involves rotation of the reference electrode $127_1$ and each one-half rotation of the prism 125 causes the collector electrodes $128_1$ and $128_2$ to apply 90°-phase signals to the respective phase detector circuits, which will thus produce output signals out of phase by 90° and drive the servomotors 112X and 112Y in accordance with the level differences between these signals and the output signal $L_1$ representing the alignment of the two superposed images.

Figure 13:
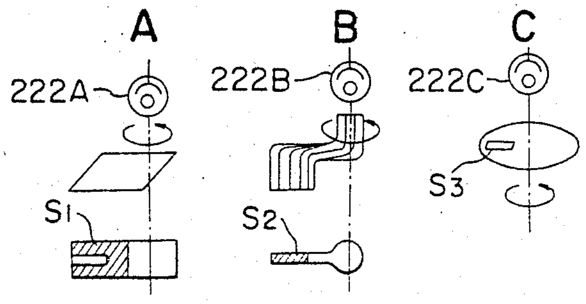
FIG. 13 shows various alternative forms of scanning means for use with the device of FIG. 5.

The embodiment described just above uses the rotatable prism 125 so that the phototube receives the circumferential portion of the superposed images of the mask opening and the referential black area of the semiconductor wafer as these images are rotated, but alternatively it is possible, as shown in FIGS. 13A, B and C, to employ a prism having a slit S1, a converging fibrous tube in the form of slit S2, or a rotatable disc having a slit S3, each of which may be rotated over and relative to the superposed images so that the image light may be received by a photoelectric converter cell 222A, 222B or 222C.

In these alternative cases, if the mask opening image $216_1$ and the semiconductor wafer image 211A both formed on the image forming plate are concentrically aligned as shown in FIG. 7, there will be produced an electrical signal corresponding to the common center P of the two images (FIG. 7) and to the center of rotation of the respective rotatable member shown in FIG. 13A, B or C (i.e., the prism, the fibrous converging tube or the slitted disc). This is because the black area on the wafer cannot be pitch-black but can be much lighter.

Figure 6:
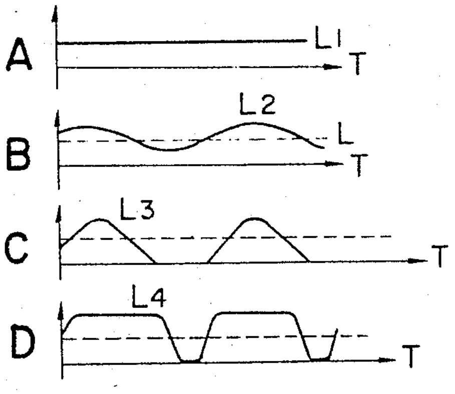
FIG. 6 shows output signal waveforms for illustrating the operation of the FIG. 5 device.
Figure 7A:
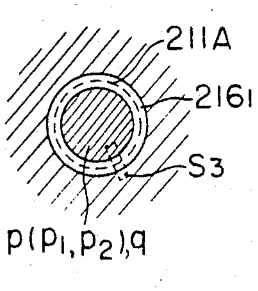
FIGS. 7A and B and FIG. 8 are schematic views of the optically superposed images for illustrating the operation of the FIG. 5 device.

If the centers P1 and P2 of the wafer image 211A and the mask opening image are coincident with each other and with the axis of the rotation *q* of the disc having the slit S3 in the manner as shown in FIG. 7A, the rotation of the slit S3 will produce an electrical signal as illustrated in FIG. 6A, thereby enabling confirmation of the fact that the wafer is in its predetermined position.

Figure 7B:
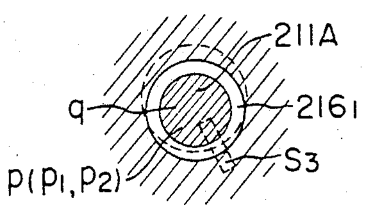
Figure 8:
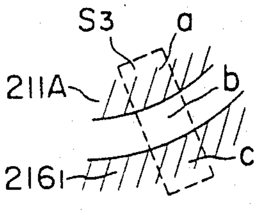
Figure 9:
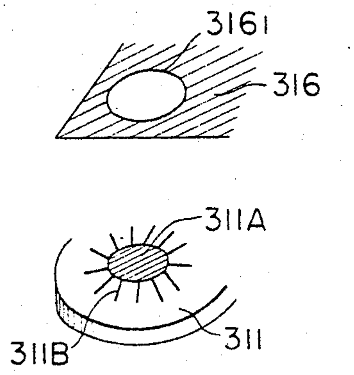
FIGS. 9 and 10 schematically show a modified form of the black area of a semiconductor wafer employed with the device of FIG. 5 and the optically superposed images of such black area and the mask reference pattern, respectively.

On the other hand, in spite of the fact that the images of the mask opening and wafer's black area are centered at P (P1, P2) as shown in FIGS. 7A and B, the center of these images may not always be coincident with the center of rotation *q* of the slit S3, as seen in FIG. 7B. In such a case, the relative position between the mask opening and the wafer in FIGS. 7A and B is in a predetermined relationship. However, in the case of the FIG. 7B, scanning rotation of the slit S3 will produce such an electrical signal as shown in FIG. 6B. Thus, even if the wafer is in its predetermined position, there may be produced such a deviation signal as shown in FIG. 6B rather than the alignment signal as shown in FIG. 6A.

Figure 10:
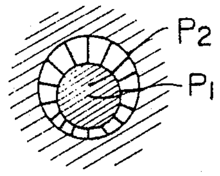

FIGS. 9 to 12 illustrate an embodiment which completely eliminates the above-noted disadvantages and employs a semiconductor wafer 311 having substantially equally spaced black lines 311B formed radially around the outer periphery of the black circle thereon. The use of such wafer 311 will provide a pattern as shown in FIG. 10 when the image of the opening $316_1$ in the mask 316 and the image of the black circle on the wafer 311 are superposed one upon the other.

Figure 11:
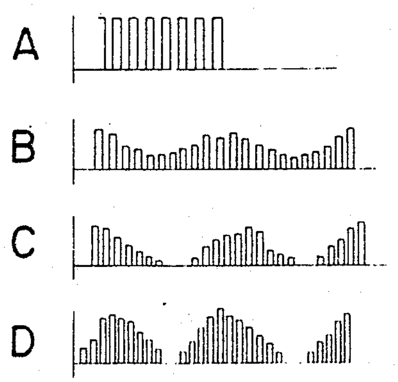
FIG. 11 illustrates the output signal waveforms provided when the wafer of FIG. 9 is employed with the device of FIG. 5.
Figure 12:
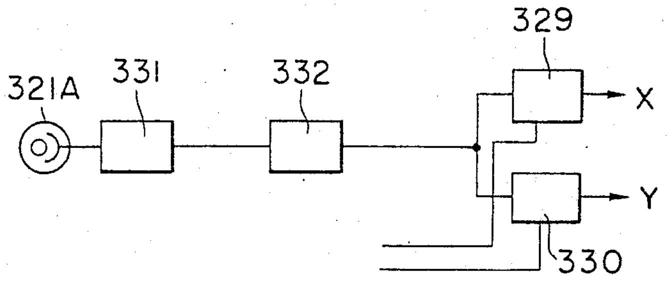
FIG. 12 is a block diagram showing the electric circuit in the FIG. 5 device using the wafer of FIG. 9.

Therefore, if in the embodiment of FIG. 5 such wafer 311 is used for the slit scanning, there will be produced electrical signals in accordance with the deviation between the center P1 of the wafer's black area and the center P2 of the mask opening, that is, such an electrical signal as shown in FIG. 11A will be produced when the two centers are coincident and such electrical signals as shown in FIGS. 11B, C and D will be produced as the deviation between the two centers is increased. As shown in FIG. 12, these signals will be passed through band-pass filter and detector 331 and 332 leading to the servomotors of FIG. 5 and thereby generally detected as the detection signals shown in FIG. 11, whereafter the signals will be phase-detected to provide respective servo voltages. Since the electrical signals shown in FIG. 11 are pulse-modulated by the radial black lines 311B outwardly extending from the black area 311A, no such error as shown in FIG. 7 will be produced when the photocell receives the light from the black area.

Figure 14:
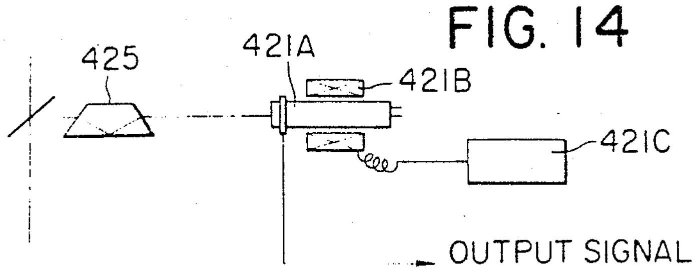
FIG. 14 is a schematic view showing the essential portion of a modified positioning device according to the present invention.
Figure 15:
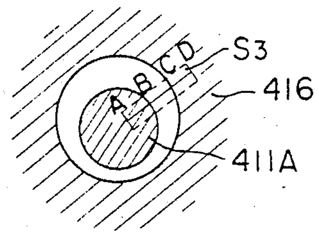
FIG. 15 is a view illustrating the scanning section of a vidicon tube in the device of FIG. 14.
Figure 16:
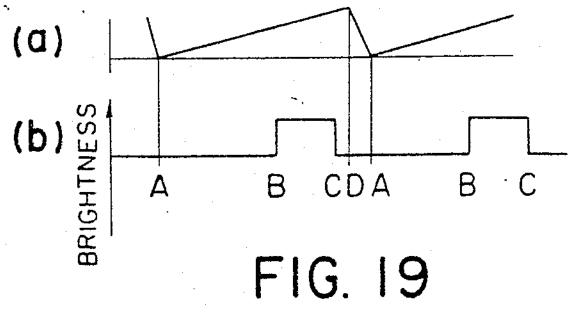
FIGS. 16(a) and (b) illustrate the scanning voltage and the detected voltage waveform of the vidicon tube used with the device of FIG. 14.
Figure 17:
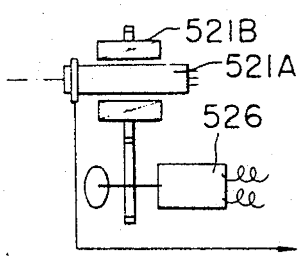
FIG. 17 shows the construction of the essential portion in a modification of the positioning device according to the present invention.
Figure 19:
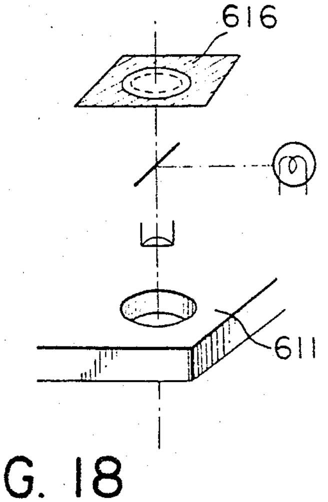
FIG. 19 schematically shows the essential portion in a further modification of the positioning device according to the present invention.

All the foregoing embodiments have been shown and described as using photocells such as phototubes, whereas use may be made of picture tubes like a vidicon as shown in FIGS. 14 and 17. In FIG. 14, there is provided an image rotator 425 corresponding to the rotatable prism 125 of FIG. 5, and further provided a vidicon tube 421A including an X-direction deflecting coil 421B connected with a deflecting voltage generator circuit 421C. The vidicon tube 421A is such that a saw-tooth waveform driving voltage as shown in FIG. 16a is applied from the generator circuit 421C to the deflecting coil 421B of the vidicon tube 421A so that only the section AD of the slit S3' for scanning the images of the wafer's black area 411A and mask opening 416 may effect the scanning in the direction X, as shown in FIG. 15, whereby the vidicon tube produces an output signal as shown in FIG. 16(b). The output signal of FIG. 16(b) so produced will be phase-detected in the manner as described previously each time the slit S3' scans 90° over the composite image of the wafer's black area and the mask opening, and then will be supplied as a servo voltage to the servomotors for moving the wafer supporting table just as in the same way as described with respect to the embodiment of FIG. 5.

Figure 18:
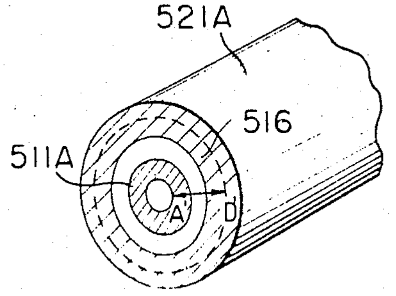
FIG. 18 schematically illustrates the light receiving surface of the vidicon tube in the device of FIG. 17.

As shown in FIG. 17, an alternative arrangement may be possible in which the image rotator is eliminated and the deflecting coil 521B of the vidicon tube may be rotated by a motor 526 with the images of the wafer's black area and the mask opening formed in superposed relationship on the vidicon tube. A further alternative is shown in FIG. 18 wherein the scanning range of the vidicon tube is limited to the section A'D' of the composite image of the wafer's black area 511A and the mask opening 516 so that the section A'D' may be rotatively scanned in accordance with the rotation of the coil 521B, whereby the output signal from the vidicon will provide an electrical signal similar to the output from the photocell 121A of FIG. 5.

Any of the foregoing embodiments has been described primarily as an application for setting a semiconductor wafer in a predetermined position, but it will be apparent that the present invention is not limited to such position adjustment and that the article for the position adjustment is not limited to semiconductor wafers, but the invention may be equally applicable, for example, to the position adjustment of an article 611 apertured with respect to a mask opening 616 formed at a reference position.

In each of the foregoing embodiments, only a single black area is formed on the wafer and correspondingly a single opening is formed through the mask, whereas an additional set of such black area and opening may be formed to enable the positional registration between the wafer and the mask to be carried out at two points. In this case, one of the two sets of wafer's black areas and mask's openings may be used for the position adjustment in the directions X and Y while the other set may be used for the position adjustment with respect to the relative inclination between the wafer and the mask, thus resulting in a higher accuracy of the position adjustment.

Figures 20, 21, 22:
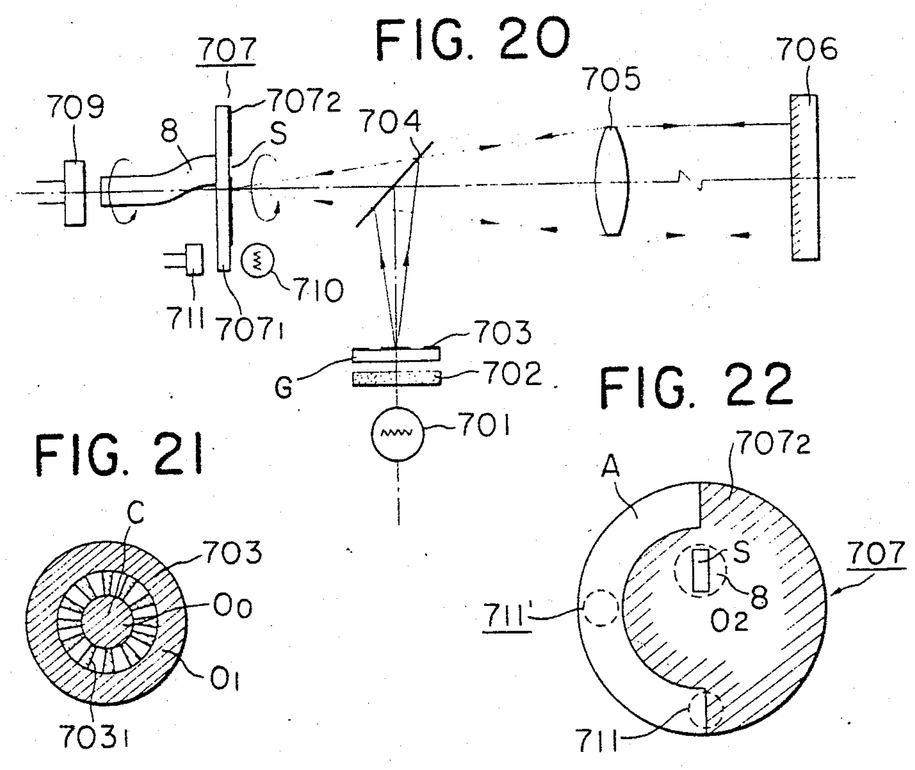
FIG. 20 is a schematic view showing the entire arrangement of the position detecting system according to a further embodiment of the present invention.
FIG. 21 shows the pattern of radial lines applicable to the device of FIG. 20.
FIG. 22 shows the construction of the scanning slit applicable to the device of FIG. 20.

FIG. 20 shows a further embodiment of the present invention. It includes an illuminating light source 701, a diverging plate 702 disposed in front of the light source 701, and an article 703 which, as shown more particularly in FIG. 21, comprises a glass substrate G having a light intercepting annular portion $O_1$ and a light-intercepting circular portion $O_0$ attached thereto, and further having $n$ light-intercepting radial lines $703_1$ equally spaced from one another and extending between the portions $O_1$ and $O_0$ in the outward direction from the center C. Further provided are a half-mirror 704, a collimater lens 705, a mirror 706 and a rotatable slitted disc 707 which, as shown more particularly in FIG. 22, comprises a transparent substrate $707_1$ having an opaque plate $707_2$ attached thereto. The opaque plate $707_2$ includes a slit S and a cut-away or transparent portion A, which subtends over approximately 180° with respect to the center of rotation $O_2$ of the disc 707.

A fibrous converging tube 708 is secured to the disc 707 on the side thereof which is opposite to the slit S. The converging tube 708 is crooked so that the axis thereof is partly coincident with the center of rotation of the disc 707. The free end face of the tube 708 has a photoelectric detector such as photodiode secured thereto, as will be described below. The disc 707 has a shaft mounted at the center of rotation $O_2$ and driven from an unshown drive motor so as to rotate the fibrous converging tube therewith. A light source or lamp 710 and a photoelectric detector 711 are disposed adjacent to a circumferential portion of the disc 707 and in opposed relationship with the disc 707 interposed therebetween. As shown in FIG. 22, a lamp 710' and a photoelectric detector 711' are disposed on the circumference of the disc 707 in 90°-out-of-phase relationship with the set of lamp 710 and a photoelectric detector 711. The photoelectric detectors 709, 711 and 711' are connected with a control circuit as shown in FIG. 27.

Figure 27:
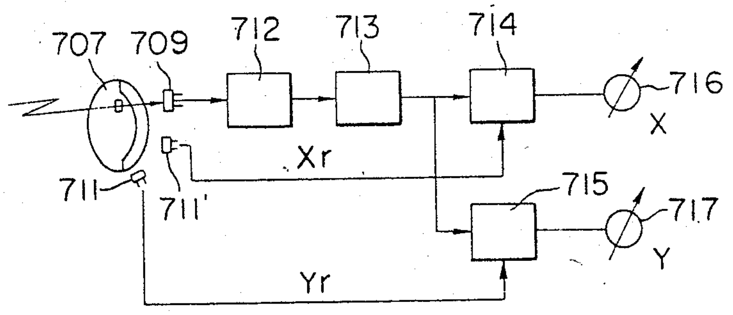
FIG. 27 is a block diagram of the electric circuit in the system of FIG. 20.

Referring to FIG. 27, the control circuit includes a limiter 712, a frequency discriminator 713, phase detectors 714 and 715, and meters 716 and 717 connected with the detectors 714 and 715 respectively. The outputs of the photoelectric detectors 711 and 711' are applied to the control inputs of the phase detectors.

Figure 23:
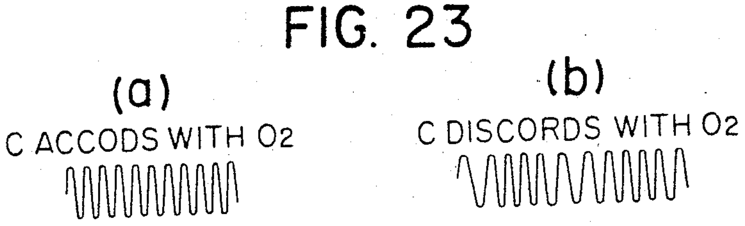
FIGS. 23(a) and (b) illustrate the output signal waveforms provided by the system of FIG. 20.

In the arrangement described just above, when the disc 707 is rotated with the article 703 having a radial pattern $703_1$ located in a predetermined position, the pattern as illuminated by the lamp 701 will provide a parallel beam of light through the half-mirror 704 and lens 705, whereafter the light will be reflected by the mirror 706 to pass back through the lens 705 and half-mirror 704 to the disc 707 so that the image of the radial pattern $703_1$ will be formed over the slit S. If the center C of the radial pattern $703_1$ is eccentric with respect to the center of rotation $O_2$ of the slit S, i.e., if the slit S is deviated from its position for scanning the radial pattern $703_1$, then the photoelectric detector 709 will produce such a frequency-modulated output signal as shown in FIG. 23(b). If the center $O_2$ is coincident with the center C, there will be produced such a constant-frequency output signal as shown in FIG. 23(a).

Figure 24:
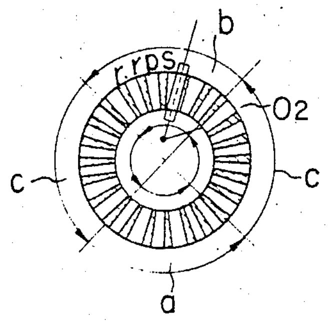
FIG. 24 illustrates the operation of the FIG. 20 system.
Figure 25:
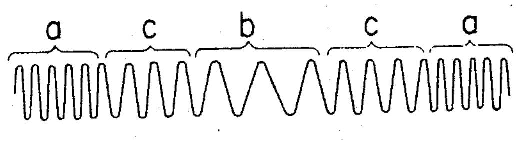
FIG. 25 shows the output signal waveform provided in relation to the operative condition as shown in FIG. 24.
Figure 26:
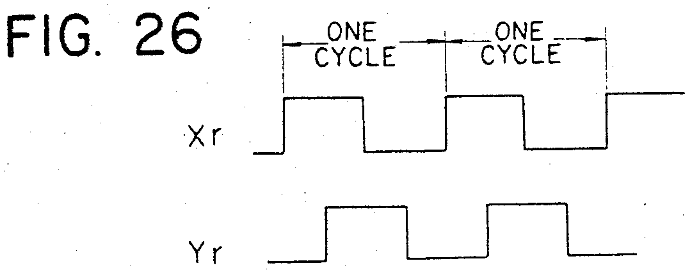
FIG. 26 shows the waveforms of phase detecting reference signals provided by the system of FIG. 20.

It is assumed that the number of revolutions of the revolving slit S is $r$. If the centers $O_2$ and C are coincident, the AC component of the output from the photoelectric detector 709 will have a constant frequency of $nr$ Hz. If the centers $O_2$ and C are deviated from each other, it will be seen from FIG. 24 that irrespective of the constant number of revolutions $r$ of the revolving slit S, the number of radial lines traversed by the slit S per unit time is greater in the area $a$ of the disc and smaller in the area $b$, with the exception of the intermediate area $c$ in which such number of radial lines is equal to that when the centers $O_2$ and C is in coincidence. As a result, the output signal will assume the waveform as shown in FIG. 25. The waveform of FIG. 25 comprises an intermediate frequency (area $c$) of $nr$ Hz and is frequency modulated by a signal with a basic wave of $r$ Hz in accordance with the deviation between $O_2$ and C or between the slit S and the pattern of radial lines $703_1$. On the other hand, the rotation of the disc 707 will cause the outputs $Xr$ and $Yr$ of the photoelectric detectors 711 and 711′ to produce signals which are in a time relationship of $r$ Hz as shown in FIG. 26. The outputs of the photoelectric detectors 711 and 711′ represent the phases of the disc 707 and are applied to the phase detectors 714 and 715, respectively. As a result, the detectors 714 and 715 will produce DC output voltages X and Y corresponding to the extent of deviation between C and $O_2$, and the levels of these output voltages represent the magnitudes of the deviations in the directions X and Y of the rectangular coordinates with the X- and Y-axis being indicative of the respective deviations. The output signals X and Y are applied to the meters, whose needles thus indicate angles of deviation corresponding to the X- and Y-component of the deviation. Therefore, by displacing the article 703 while viewing the meter needles until the needles are displaced to zero angle of deviation, the article 703 may be set to a predetermined position where the slit S can correctly scan the pattern of radial lines $703_1$.

Figure 28:
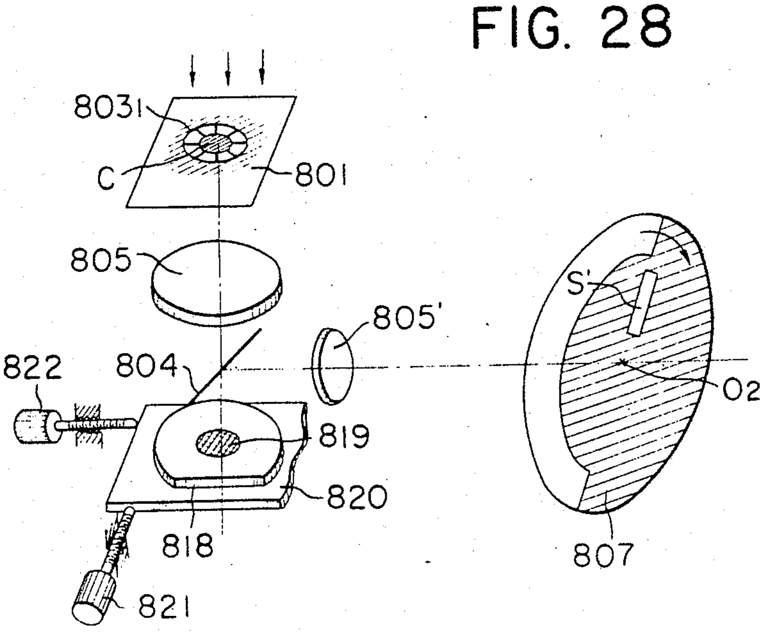
FIG. 28 schematically shows the arrangement of the position detecting system according to a further embodiment of the present invention.

FIG. 28 illustrates an application of the above-described arrangement to an IC mask printing apparatus.

In FIG. 28, the collimater lens 705 and mirror 706 shown in the embodiment of FIG. 20 are omitted and a photomask 801 formed with a radial line pattern $803_1$ is illuminated by an unshown light source. A lens 805, a half-mirror 804 and a lens 805′ replace the aforesaid collimater lens 705 and mirror 706. An IC wafer 818 to be set in a predetermined position with respect to the mask 801 is disposed in opposed relationship with the mirror 804. The wafer 818 has a circular black area 819 formed on the surface thereof. The black area 819 comprises a number of intersecting etched lines formed to define a circular outer circumference so that incident light on such area may be irregularly reflected to provide substantially no reflected light and thus form an optically black area.

Although not shown, a pattern to be printed onto the semiconductor wafer 818 may be formed on the photomask 801, and a printer device for printing such pattern onto the wafer 818 may be provided separately. The wafer 818 rests on a support table 820 which may be moved in the directions X and Y by rotating manually operable dials 821 and 822.

With this arrangement, the pattern of radial lines $803_1$ on the photomask 801 and the circular black area 819 on the wafer 818 may be optically superposed one upon the other by the half-mirror 804. The images thus superposed may be formed on the disc 807 through the image forming lens 805′ so that the radial lines $803_1$ and the circumferential edge of the circular black area 819 are formed over the slit S′ on the disc 807. Subsequently, when the disc 807 is rotated, meters 716 and 717 will assume predetermined angles of deviation in accordance with the extent of deviation between the center $O_2$ of the disc 807 and the center C of the mask 801, i.e., the extent of deviation between the slit S′ and the pattern of radial lines $803_1$, in the same manner as described with respect to the previous embodiment, thus indicating the extent of such deviation. Therefore, by changing the position of the mask 801 so that the meter needles may assume zero positions, the mask 801 may be set to a predetermined position with respect to the center $O_2$ of the disc 807, that is, the fixed reference position, whereby the radial line pattern on the mask may be correctly set to a position with respect to the slit S′. Subsequently, the support table 820 may be moved as by separately provided servo means (not shown), thereby positioning the wafer 818 with respect to the mask 801.

Figure 29:
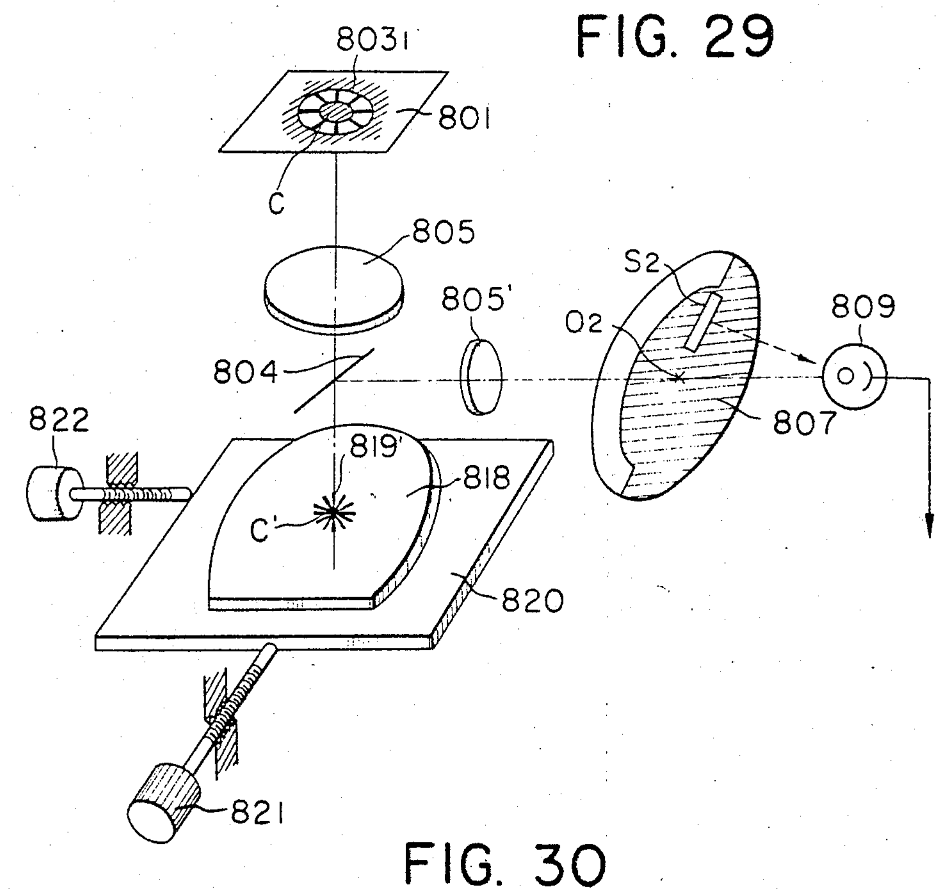
FIG. 29 schematically shows the arrangement of the position detecting system according to still a further embodiment of the present invention.
Figure 30:
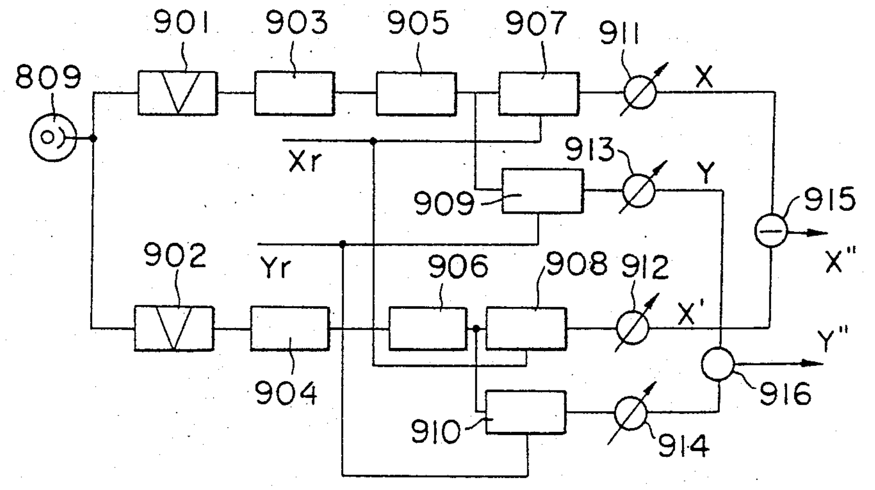
FIG. 30 is a block diagram of the electric circuit applicable to the system shown in FIG. 29.

FIG. 29 shows a further modification of the present invention in which the positioning of the wafer in the FIG. 28 embodiment is photoelectrically accomplished. This embodiment differs from that of FIG. 20 in that a radial pattern is formed on the wafer rather than the circular black area. In FIG. 29, corresponding parts are designated by similar reference numerals used in FIG. 28 to clarify the correspondence between the two embodiments. A wafer 818 has a radial pattern of etched lines 819′ formed thereon, the number of these radial lines being selected to $n_0$ which is different from $n$ for the radial lines formed on a photomask 801. The pattern of radial lines $803_1$ on the photomask 801 and the pattern of radial lines 819′ on the wafer 818 may be superposed one upon the other on a half-mirror 804 and focused on the disc 807 at the slit S′ thereof. A photoelectric detector 809 is disposed behind the slit S′ and, as shown in FIG. 30, connected with the input of a band-pass filter 901 for passing therethrough a signal of center frequency $nr$ Hz and with the input of a band-pass filter 902 for passing therethrough a signal of center frequency $n_0r$. The outputs of these filters in turn are connected with limiters 903 and 904, respectively, for removal of variable amplitude components. The outputs of the limiters 903 and 904 are connected with frequency discriminators 905 and 906, respectively, which in turn are connected with phase detectors 907, 909 and 908, 910, which are also connected with meters 911–914 and further with subtracting circuits 915 and 916.

As the disc 807 is rotated and the output from the photoelectric detector 809 passes through the filters 901 and 902, the output of the filter 901 will produce a signal component corresponding to the radial pattern on the photomask 801 and the output of the filter 902 will produce a signal component corresponding to the radial pattern on the wafer 918. The signal components corresponding to the patterns of radial lines $903_1$ and 919′ contain therein a component corresponding to the deviation between the center $O_2$ of the disc 907 and the center C of the radial pattern $903_1$, as described above, and therefore, the outputs from the frequency discriminators 905 and phase detectors 907, 909 represent components X and Y in the directions X and Y of the aforesaid deviation, as in the case of FIG. 20. On the other hand, the output from the filter 902 contains therein a signal component corresponding to the radial pattern 819, and such signal component in turn includes a component corresponding to the extent of deviation between the center $O_2$ of the rotating disc 807 and the center C′ of the radial pattern 819′ on the wafer 818. The output from the filter 902 will be divided into components X′ and Y′ in the directions X and Y of the deviation between $O_2$ and C′ through the limiter 904, frequency discriminator 906 and phase detectors 908, 910. The operating circuits 915 and 916 will carry out the operations of $(X-X')$ and $(Y-Y')$. If $X-X'=X''$ and $Y-Y'=Y''$, then $X''$ and $Y''$ will mean the components in the directions $X$ and $Y$ of the deviation between the center C of the mask and the center C′ of the wafer 818, as measured with the center of rotation $O_2$ of the disc 907 as a fixed absolute reference point. Thus, by connecting the meters with the outputs of the operating circuits 915 and 916 in the manner as shown in FIG. 27, and by setting the wafer supporting table so that the meter needles indicate zero angle of deviation, the wafer 918 may be set in a desired position with respect to the mask 901.

In the various embodiments described hitherto, the arrangements for those processes such as bonding and printing which are subsequent to the positioning of an article such as wafer or the like have been omitted in the drawings to facilitate the understanding of the description. The various deviations have been shown and described as being indicated by meters, but alternatively Braun tubes may also be employed in such a manner that signals for the deviations are applied to the Braun tubes to indicate the deviations by the positions of the bright lines thereon. As a further alternative, the signals may be applied to servo circuits whose outputs drive servomotors to automatically displace and set an article to a desired position.

Figures 31, 38A, 38B:
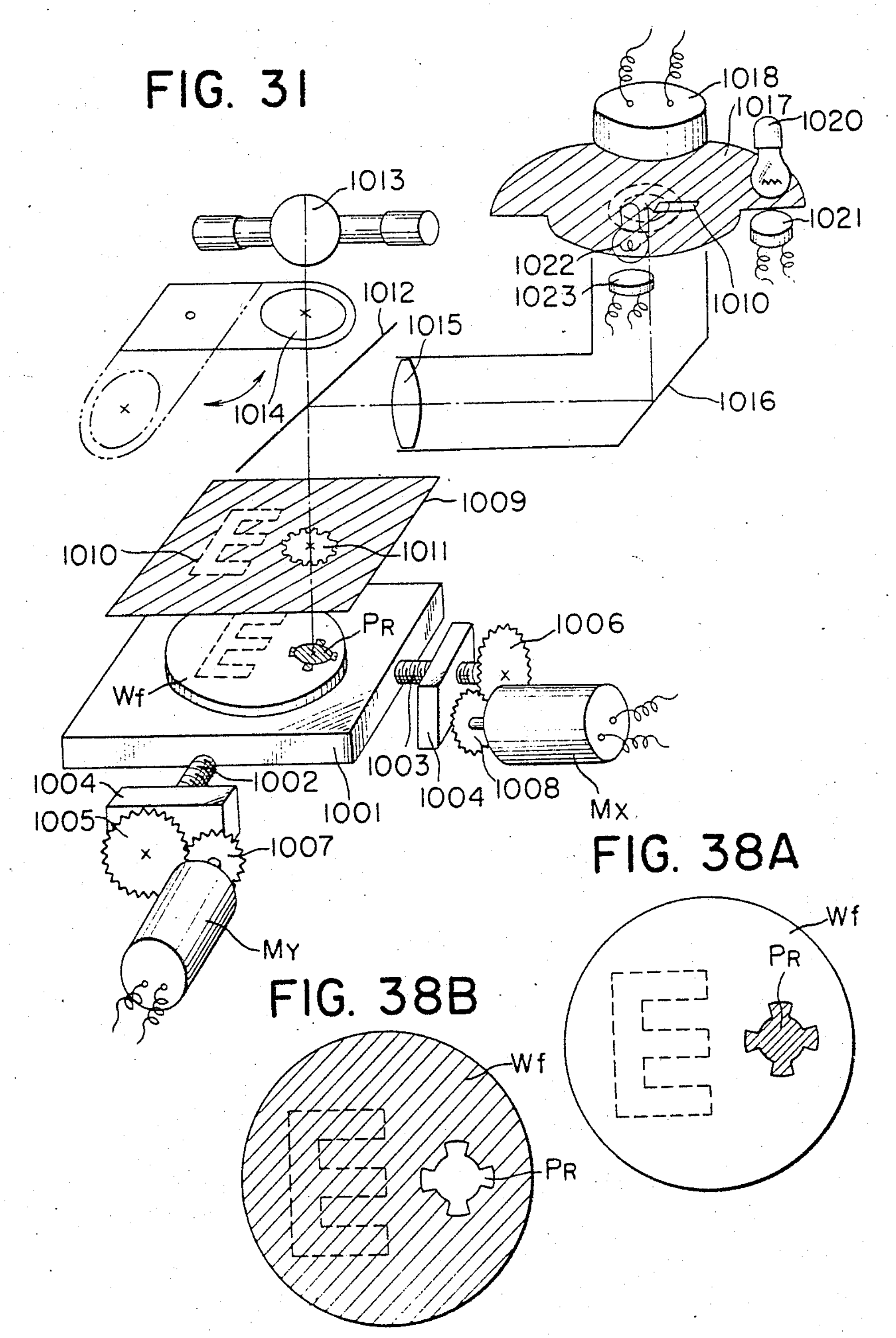
FIG. 31 schematically shows the arrangement of the position detecting system according to yet another embodiment of the present invention.
FIGS. 38A and B are plan views of the wafer as it is illuminated by reference light.

FIGS. 31 and 32 show a further form of the present invention embodied in a semiconductor element positioning device for an integrated circuit element printing apparatus. As shown, there are provided a wafer supporting table 1001, tangent screws 1002 and 1003 for pushing the side edges of the support table 1001, fixed frames 1004 fitted on the tangent screws 1002 and 1003, driven gears 1006 secured to the outer ends of the tangent screws 1002 and 1003, drive gears 1007 and 1008 mounted on the drive shafts of motors MY and MX and meshing with the driven gears 1005 and 1006, and a semiconductor wafer element $Wf$ resting on the support table. The wafer element $Wf$ has a circular referential pattern PR which comprises a group of minute rectangular steps formed as by etching on the surface of the wafer element, as clearly shown on an enlarged scale in FIGS. 34A and B.

Figure 34A:
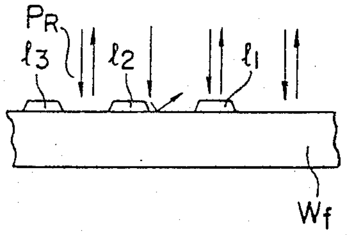
FIG. 34A is an enlarged, fragmentary, sectional view of the pattern area of the wafer shown in FIG. 33.
Figure 34B:
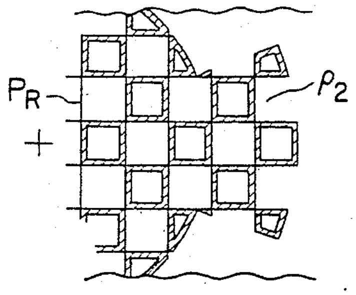
FIG. 34B is an enlarged, fragmentary plan view of the pattern area of the wafer shown in FIG. 33.
Figure 35:
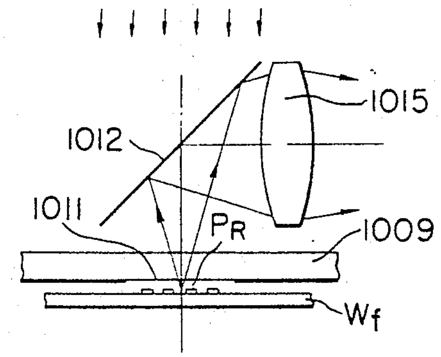
FIG. 35 shows the wafer of FIG. 33 as it is illuminated by reference light.

Referring to FIG. 34A, the referential pattern PR is provided by a group of minute portions $l_1$, $l_2$, $l_3$ formed in stepped form on the wafer $Wf$ by etching and each covered with a rectangular layer of $SiO_2$, so that when the wafer $Wf$ is illuminated from thereabove, the side walls of the stepped minute portions may laterally reflect the light while the other areas of the wafer may alone reflect the light upwardly. Thus, when the illuminated wafer is viewed from thereabove, the referential pattern area will be seen with a lower brightness in the minute rectangular stepped portions, thus generally presenting a lower brightness throughout the referential pattern area than in the remaining area of the wafer, as shown in FIG. 34B.

Figure 36A:
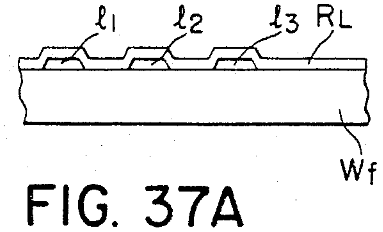
FIGS. 36A and B are an enlarged, fragmentary, sectional view and an enlarged, fragmentary front view, respectively, of the photoresist layer applied to the wafer.
Figure 36B:
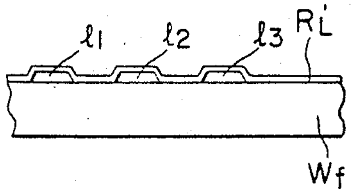

As seen in FIGS. 36A and B, the wafer $Wf$ has the upper surface thereof coated with photoresist layers RL and RL′. These photoresist layers may be those conventionally used in the pattern printing process of the IC manufacture and need not be described further. The referential pattern PR on the wafer $Wf$ further has four radially outwardly projected areas P1–P4 disposed circumferentially thereof. Also, the reference pattern 1011 on the photomask 1009 has radially outwardly projected areas $1011_1$–$1011_n$ formed circumferentially thereof.

Where the wafer $Wf$ is formed of Si or like material, the light-and-shade contrast between the referential pattern area and the rest of the wafer may be reversed in dependence of the thickness of the photoresist layer RL. This is because the thickness of the photoresist layer RL may be subject to an error in order of 100 $\mu$m in the coating process as is usual with the manufacture of integrated circuits, thus varying the reflection factor of the wafer surface from several to about 30 percent for monochromatic light. On the other hand, the dark areas of the referential pattern, i.e., the minute stepped portions resist the influence from such thickness error, thus maintaining a reflection factor of 10 percent or near. Therefore, the reflection factor is lower in the surface area of the wafer $Wf$ than in the dark areas of the referential pattern, and this may result in the reversal of the light-and-shade contrast therebetween.

Figure 37A:
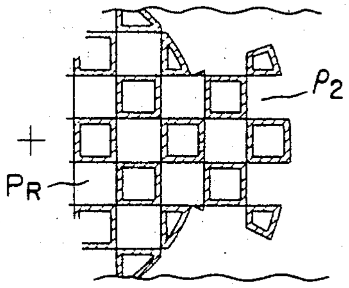
FIGS. 37A and B are enlarged, fragmentary plan views of the referential pattern as the photoresist layer of FIGS. 36A and B is illuminated by reference light.
Figure 37B:
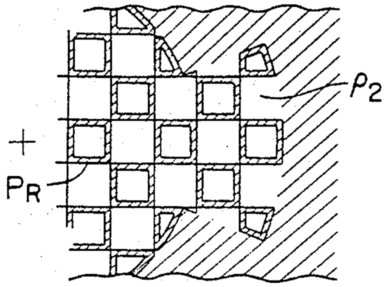

Such condition can be seen in FIGS. 38A and B, that is, the light-and-shade contrast is reversed in the case where the reflection factor is higher in the remaining area of the wafer than in the dark area of the referential pattern PR (see FIGS. 38A and 37A) and in the case where the reflection factor is lower in the remaining area of the wafer than in the dark area of the referential pattern PR (see FIGS. 38B and 37B).

Figure 40A:
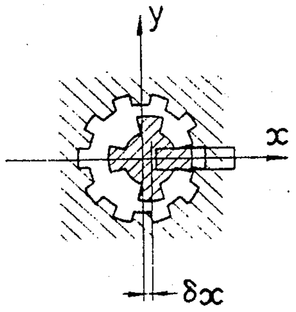
FIGS. 40A and B to FIGS. 43A and B illustrate the conditions under which the photoelectric scanning is effected.
Figure 41A:
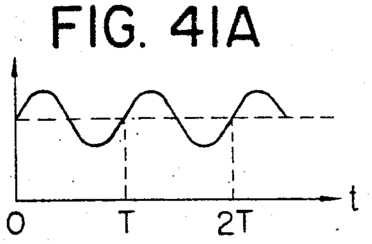
Figure 41B:
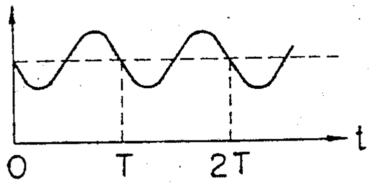
Figure 42A:
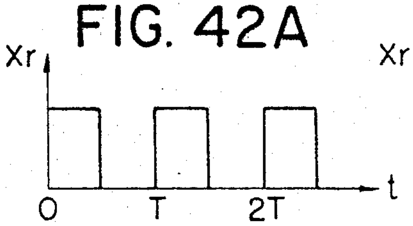
Figure 42B:
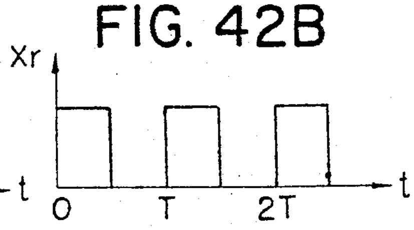
Figure 43A:
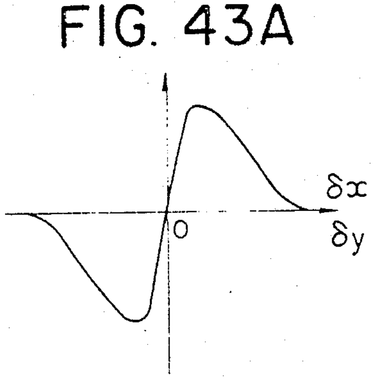
Figure 43B:
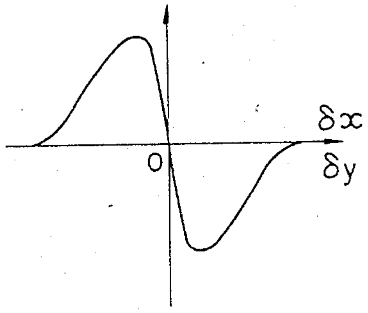
Figures 44A, 44B:
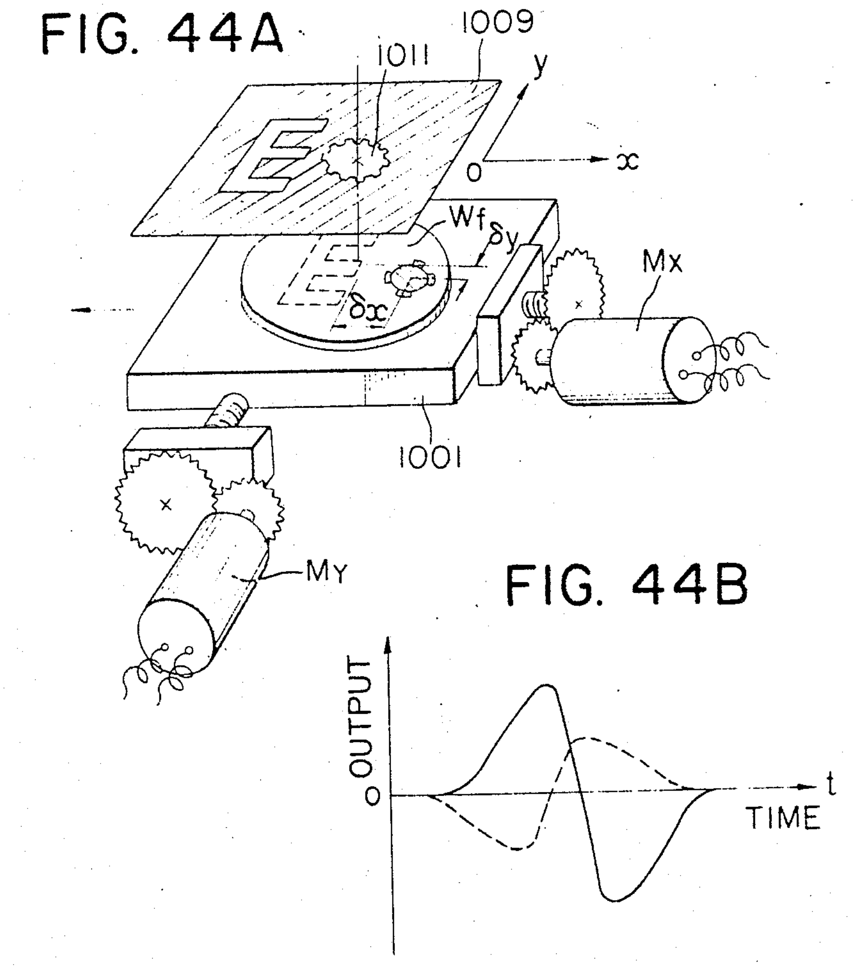
FIG. 44A schematically shows the manner in which the semiconductor wafer is moved in one direction.
FIG. 44B illustrates the scanning output waveform provided when the semiconductor wafer is moved in the manner as shown in FIG. 44A.

Consequently, where the wafer Wf is used with the embodiment of FIG. 5, the light-and-shade contrast of the wafer Wf is reversed in accordance with the thickness of the photoresist layer as shown in FIGS. 40A and B, so that the electrical output signals produced through the slit will take such waveforms as shown in FIGS. 41A and B, and the output signals corresponding to the signal D of FIG. 6 will take such waveforms as shown in FIGS. 41A and B, these waveforms being just 180° out of phase. Therefore, it would be impossible to position the wafer without determining the contrast condition of the wafer $Wf$, except when the positioning is effected manually. The embodiment of FIGS. 31 and 32 is directed to enabling the detection of such contrast condition. Referring again to FIG. 31, there are seen a mask 1009 having a printing pattern 1010 and a reference pattern 1011 formed therein, a half-mirror 1012 overlying the mask 1009, a printing light source 1013, a filter 1014 for intercepting light of wavelengths sensitizing the photoresist layers and rotatably mounted between the light source 1013 and the mirror 1012, an image forming lens 1015, a fixed mirror 1016, a rotatable slitted plate 1017 corresponding to the aforesaid rotatable slit 807, a photoelectric converter element 1018 for receiving light passed through a slit 1019 formed in the rotatable slitted plate 1017, and two sets of light sources and photoelectric converter elements 1020, 1021, 1022, 1023 for detecting the phase of the slitted plate and disposed in opposed relationship with the slitted plate interposed therebetween.

Figure 32A:
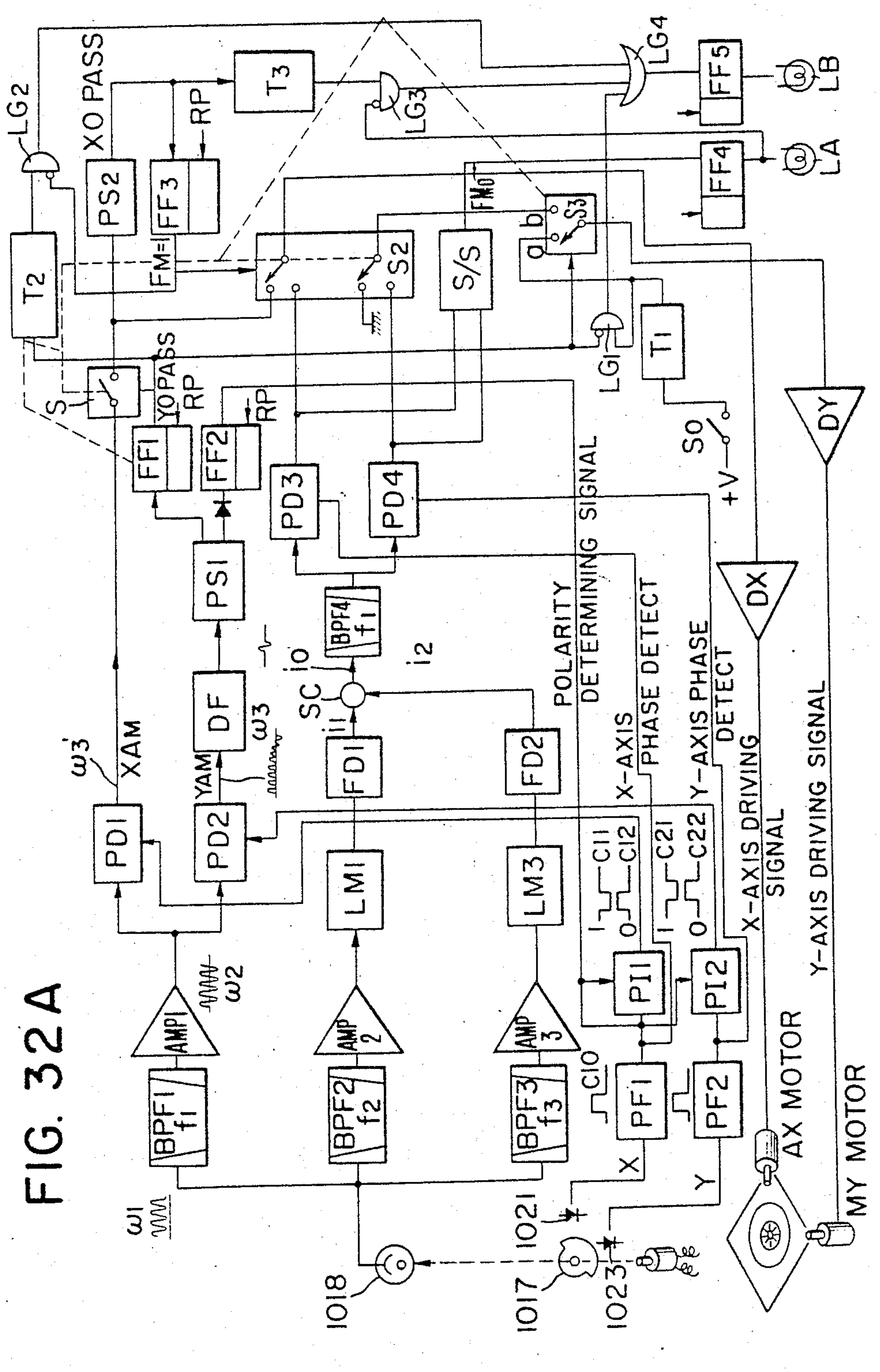
FIG. 32A is a block diagram of the control circuit applicable to the system of FIG. 31.

FIG. 32 shows an electric circuit for the device of FIG. 31. This circuit includes band-pass filters BPF1, BPF2 and BPF3 whose inputs are connected with the photoelectric converter element 1018. The filter BPF1 functions to pass therethrough only a signal of $f_1$ Hz corresponding to the number of revolutions of the rotatable slitted plate 1017. The filter BPF2 functions to pass therethrough only a signal component in the vicinity of $f_2$ Hz provided when the rotating slit 1019 scans the radial projections $1011_1$–$1011_n$ of the reference pattern 1011 formed on the mask. The filter BPF3 functions to pass therethrough only a signal component in the vicinity of $f_3$ Hz provided when the rotating slit 1019 scans the radial projections P1–P4 formed circumferentially of the referential pattern PR on the wafer W*f*. All these filters BPF1–BPF3 block any other signal component. The circuit further includes amplifiers Amp1, Amp2, Amp3; phase detectors PD1, PD2 (corresponding to the elements 907, 909 of FIG. 30) for effecting phase detection in accordance with phase control reference signals provided from the rotatable slitted plate 1017 through photoelectric converter elements 1021, 1023 and through pulse forming circuits PF1, PF2 and thence phase inverter circuits PI1, PI2; a differentiation circuit DF; and positive level peak sensors PS1, PS2 responsive to peak values of input signals exceeding a predetermined threshold to supply signals independently of the polarity of the input signals thereto. PS1 also functions to supply a polarity changing signal to the flip-flop FF2 when the input thereto is a signal rising in the negative sense and having a sufficient magnitude to satisfy the aforesaid conditions. There are further seen flip-flops FF1–FF5; switching circuits S1, S3 shiftable from the position of FIG. 32A in response to the setting of the flip-flop FF1; a switching circuit S2 shiftable to its contact *b* in response to the setting of the flip-flop FF3; amplitude control circuits LM1, LM2 for the output signals from Amp2 and Amp3; frequency discriminator circuits FD1, FD2; a band-pass filter BPF4 for passing therethrough a signal component of center frequency $f_1$; phase sensitive detectors PD3, PD4; timer circuits T1–T3; inhibit logic gates IG1, IG2, IG3; an OR gate LG4; a reset pulse RP for resetting flip-flops FF1–FF5; and alarm lamps LA, LB. Also seen is a subtracting circuit SC for subtracting the input component $i_1, i_2$ thereto; and a signal detector circuit SS for detecting the presence of an input thereto and applying an output pulse to the setting input of the flip-flop FF4 when the inputs thereto are both zero.

In operation, a wafer W*f* is placed on the support table in such a manner that the center of the wafer's referential pattern PR is elaborately deviated by $\delta y$ in the direction Y from the center of the reference pattern 1011 on the photomask 1009 as shown in FIG. 40A, whereafter the wafer W*f* is illuminated by the light source 1013 through the filter 1014. The superposed images of the wafer's referential pattern PR and the mask's reference pattern are directed through the half-mirror 1012 via the mirror 1016 and rotating slit 1017 to the photoelectric converter element 1018. The start switch $S_0$ for the wafer supporting table 1001 is closed to operate the timer circuit T1 and accordingly drive the motor M*y* through the switching circuit S3 and motor driving circuit D*y*. As the result, the support table 1001 begins to move in the direction Y. At the same time, due to the plate 1017 being in rotation, the photoelectric converter element 1018 produces a signal component of frequency $f_1$ in accordance with the extent of deviation between the wafer W*f* on the support table 1001 and the reference pattern 1011 on the mask 1009, and also signal components of frequencies $f_2$ and $f_3$ in accordance with the constant number of revolutions of the slitted plate 1017. These signals of frequencies $f_1$, $f_2$ and $f_3$ are applied through the band-pass filters BPF1, BPF2, BPF3 and Amp1, Amp2, Amp3 to the phase detector circuits PD1, PD2 and to the amplitude limiter circuits LM1, LM2. With the rotation of the slitted plate 1017, the circumferential cut-away portion thereof extending over 180° successively intercepts lights from the light sources 1020, 1022 disposed in 90° out-of-phase relationship, so that these lights are successively applied to the photoelectromotive elements such as photoelectric converter elements 1021, 1023 or photodiodes disposed in opposed relationship with the respective light sources 1020, 1022. Thus, for each one rotation of a slitted plate 1017, the respective elements 1021, 1023 produce synchronizing signals which are 90° out of phase as shown by C1 and C2 in FIGS. 32A.

On the other hand, the aforesaid signal component, produced by the photoelectric converter element 1018 and having an amplitude corresponding to the extent of deviation between the center of the circular reference pattern 1011 on the photomask 1009 and the center of the referential pattern PR on the wafer W*f*, as shown in FIG. 40A (or FIG. 6), and having a frequency $f_1$ corresponding to the number of revolutions of the slitted plate 1017, is treated through the band-pass filter BPF1, Amp1 and phase detector circuit PD2, and thence applied to the differentiation circuit DF.

The motor M*y*, which drives the support table 1001 in the Y-axis direction upon closing of the switch $S_0$, continues to move the wafer W*f* in the same direction because a driving voltage is supplied to the timer T through switch S3. When the referential pattern on the wafer W*f* and the reference pattern on the photomask are registered with each other in the Y-axis direction, the output level of the phase detector circuit PD2 becomes approximately zero. Further movement of the wafer Wf in the Y-axis direction causes the output of Amp1 to produce an output signal W2 of frequency $f_1$ corresponding in level to the extent of deviation. When the output level of the phase detector circuit PD2 has become zero, a trigger pulse W4 is derived from the differentiation circuit DF to set the flip-flop FF1 through the peak sensor PS1 in accordance with the amplitude and polarity of such pulse (see (3) and (4) in FIG. 32B). As will be further described, the output signal from the phase detector circuit PD2 becomes a positive or a negative component in accordance with the phase of the phase reference signal C21, but in FIG. 32B this signal is shown as a positive signal indicated by a solid line (2).

Figure 40B:
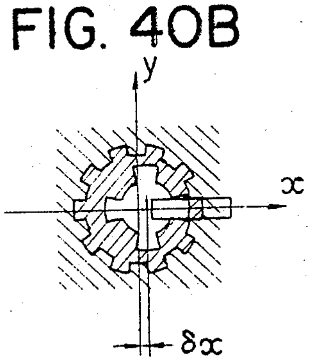

The above description has been made with respect to the case where the referential pattern PR on tne wafer Wf is black. In a case where the brightness of the reference pattern is higher than that of the remaining area of the wafer in dependence of the thickness of the photoresist layer on the wafer, the contrast on the wafer is reversed between the referential pattern and the rest of the wafer (see FIGS. 38B and 40B). In this latter case, movement of the wafer Wf with its position deviated in the direction Y will cause the phase detector PD2 to produce an output signal of negative sign as shown by dotted line W3 in FIG. 32B, so that the referential pattern PR of the wafer Wf and the reference pattern 1011 of the mask are registered with each other in the direction Y. As the wafer is further moved in the Y-axis direction, the output of the phase detector PD1 becomes a positive signal and the differentiation circuit DF produces a signal which rises in the positive sense when an alignment in Y-axis direction in reached. The subsequent peak sensor PS1 will not apply a setting signal to the flip-flop FF2 connected in the manner as described previously, because the input signal to PS1 rises in the positive sense, and thus the flip-flop FF2 maintains a reset condition.

Figure 32B:
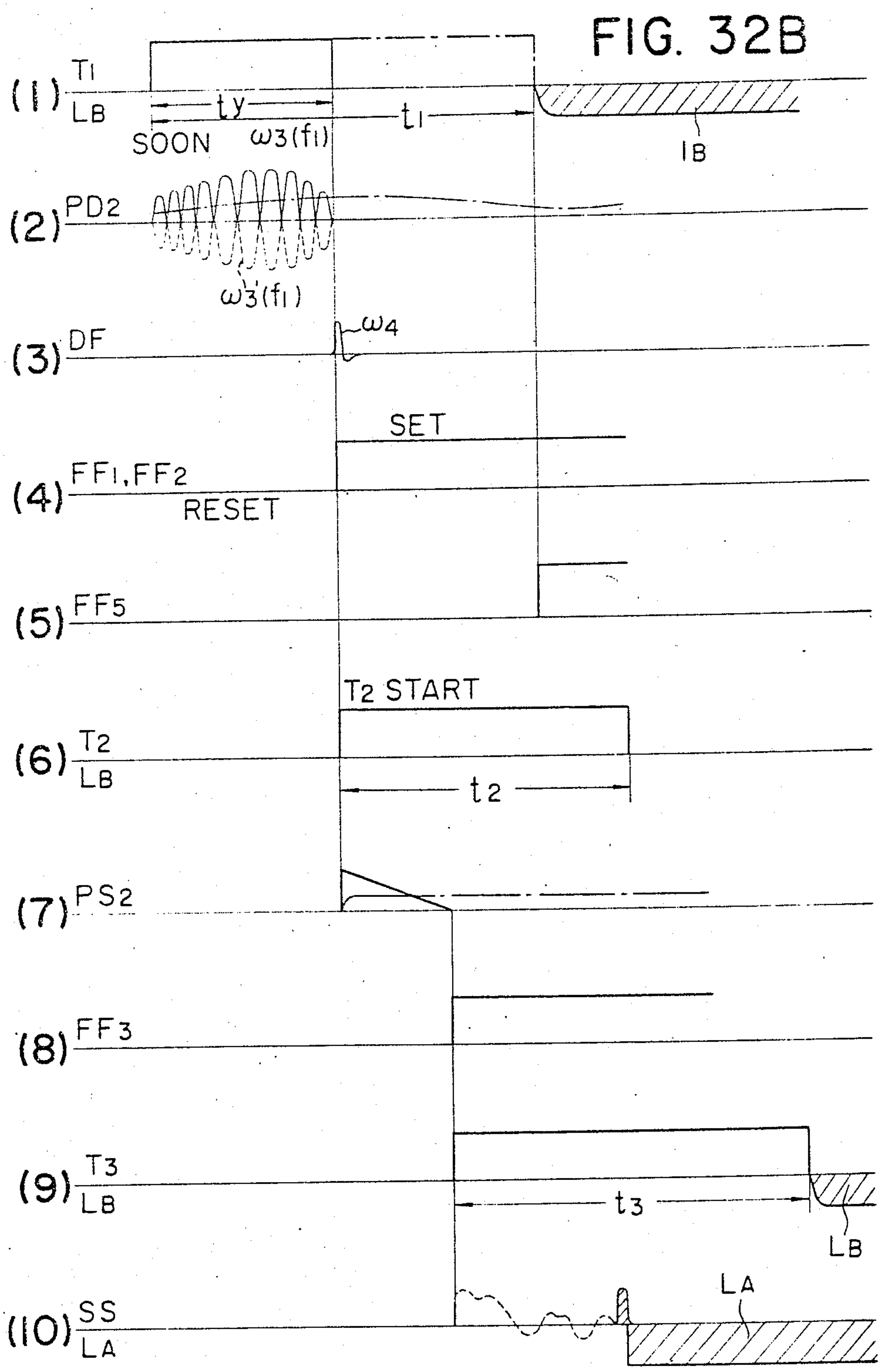
FIG. 32B illustrates the waveforms of various operating signals in the circuit of FIG. 32A.
Figure 33:
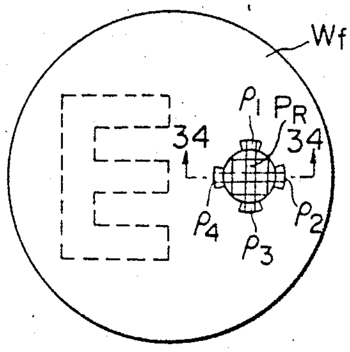
FIG. 33 is a plan view of the semiconductor wafer applicable to the system of FIG. 31.

Setting of the flip-flop FF1 closes the switching circuit S1 provided by a relay contact connected with the setting output circuit of this flip-flop. Also, setting of the flip-flop FF2 causes signals "1" to be applied to the control inputs of the phase inverter circuits PI1, PI2, whereby the input signals to the inverter circuits PI1, PI2 are shifted over 180° so that the output signals therefrom are inverted in 180° out-of-phase relationship as indicated by C11 and C21 in FIG. 38A. On the other hand, if the flip-flop FF2 is not set but maintains its reset condition, the output signals provided by the phase inverter circuits PI1, PI2 will be in phase with the input signals thereto. The output from the phase inverter circuit PI2 is applied to the synchronizing input of the phase detector circuit PD2, thereby defining a phase reference signal so that the output of the phase detector PD2 may be of the polarity corresponding to the Y-directional deviation elaborately given as mentioned previously (i.e., a signal W3′ similar to the signal W3 shown at (2) of FIG. 32B). The phase detector PD1 also produces an output signal W3 similar to the output of the phase detector PD2. Thus, the signal as shown at (2) of FIG. 32B is applied through the switching circuits S1 and S2 to the input terminal of the driving circuit D$x$ for the motor M$x$, which is thus supplied with a driving voltage and driven in the positive direction to move the support table 1001 in any modified direction. With such movement of the support table, the wafer wf thereon is moved by a distance $\delta x$, whereupon the signal W3′, in the same way as the signal W3 shown at (2) in FIG. 32B, reaches zero level to nullify the output of the motor driving circuit D$x$, thus deenergizing the motor M$x$.

Through the above-described operation, the referential pattern of the wafer Wf and the reference pattern of the photomask are registered with a rough accuracy.

If the contrast between the referential pattern PR and the rest of the semiconductor wafer Wf is not so great and the output of PD2 is at the low level as represented by the valley in the chain-line curve indicated at (2) in FIG. 32B, then the peak detector circuit PS1 will not be operated and the flip-flops FF1, FF2 will not be changed over into set position. Thus, the motor M$y$ will continue to revolve, and when a time determined by the timer circuit T1 has elapsed, the lamp LB will be turned on through the circuits LG1, LG4 and flip-flop FF5 to indicate the fact that the wafer resting on the supporting table cannot be set in position. Upon closing of the switching circuit S1, the timer circuit T2 will start time-count. In response to the setting of the flip-flop FF3, the switching circuit S2 will shift from its contact $a$ to its contact $b$, whereupon an accurate positioning operation for the wafer Wf will be entered.

Since the photoelectric converter element 1018 scans the radial lines 1011$_1$–1011$_n$ formed circumferentially of the reference pattern on the photomask and the radial lines P1–P4 formed circumferentially of the wafer's referential pattern simultaneously, the element 1018 will produce output signals frequency-modulated in accordance with any extent of deviations present between the center of rotation of the rotatable slitted plate 1017 and the centers of the radial patterns P1–P4 and 1011$_1$–1011$_n$, as described above with respect to FIG. 20. Only the output signal components in the vicinity of frequencies $f_2$ and $f_3$ from the element 1018 are selected through the band-pass filters BPF2 and BPF3. The respective filters have such band-widths as to permit the passage of the aforesaid signal frequency components frequency-modulated in accordance with the extent of deviations. The outputs from the filters BPF2 and BPF3 will be applied to the frequency discriminator circuits FD1 and FD2 through Amp2, Amp3 and limiter circuits LM1, LM2. The discriminator circuits FD1 and FD2 will produce signals corresponding to the extent of frequency deviation of the input signals from the respective center frequencies $f_2$ and $f_3$, and the levels of these two signals represent the extent of deviation of the center of the photomask's reference pattern 1011 from the center of the rotatable slitted plate and the extent of deviation of the center of the wafer's referential pattern PR from the center of the rotatable slitted plate.

The outputs $i_1$ and $i_2$ from FD1 and FD2 will be subjected to the subtraction by the subtracting circuit SC, whose output signal $i_0$ represents, in terms of analogous amplitude, the extent of relative deviation between the center of the wafer's referential pattern PR and the mask's reference pattern 1011, as measured with the center of the slitted plate 1017 as the reference point. (Such deviation corresponds to the output from the operating circuit 915 shown in FIG. 30.)

The output $i_0$ from the subtracting circuit SC will then be applied to the phase detector circuits PD3, PD4 through the band-pass filter BPF4 which permits the passage of frequency components centering about $f_1$. The phase detectors PD3 and PD4, like PD1 and PD2, discriminate between the phases of the input signals thereto in accordance with the reference phase signals from the phase inverters PI1 and PI2, whereafter the phase detectors PD3 and PD4 will produce signals corresponding to the deviation in X-direction and the deviation in Y-direction, respectively. Since the switching circuit S2 has already been changed over to its contact $b$ upon setting of the flip-flop FF3, the outputs from the phase detectors PD3 and PD4 will be applied through the switching circuit S3 to the motor driving circuits D$x$ and D$y$, respectively, which will thus energize the motors M$x$ and M$y$ in accordance with the levels and polarities of the applied signals. After a time $t_2$, the timer circuit T2 will stop its time-counting action, and in the meantime the wafer $Wf$ will be moved in X-direction until the deviation in this direction becomes zero, whereupon the flip-flop FF3 is set. Should the flip-flop FF3 fail to be set after the time $t_2$ has passed, the lamp LB will be turned on through LG4 and FF5. On the other hand, the signal detector circuit SS will detect the fact that the outputs from PD3, PD4 have reached the zero level, thus setting the flip-flop FF4 and turning on the lamp LA to indicate the completion of the wafer positioning operation (see (10) in FIG. 32B).

Figure 39A:
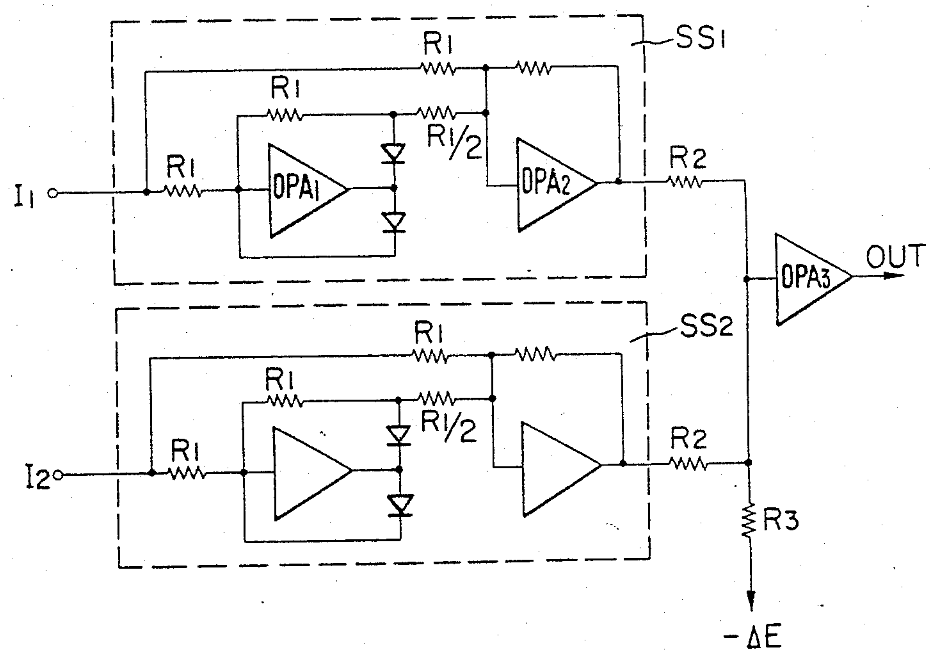
FIGS. 39(A), (B) and (C) particularly show various circuit portions of the circuitry shown in FIG. 32A.

FIG. 39(A) shows a specific example of the signal detector circuit SS (SS1, SS2) applicable to the electric circuit of FIG. 32A. The detector circuit includes operation amplifiers OPA1, OPA2, OPA3, diode D and fixed resistors R1, R2 and R3. In the presence of an input signal at the input $I_1$, the operation amplifiers OPA1 and OPA2 constitute a double-wave rectifier circuit and the operation amplifier OPA2 produces a positive output independently of the polarity of the signal at the input $I_1$. The input of the operation amplifier OPA3 is supplied with a bias of $-\Delta E$ through the resistor R3, and the output of OPA3 is variable in such a manner that it becomes negative when the amplification degree of the amplifier OPA1 is great and as long as the amplifier OPA2 produces its output and that it abruptly becomes positive when the output of OPA2 becomes lower than $-\Delta E$. Therefore, when the level of the signal applied to the input $I_1$ becomes lower than $-\Delta E$, the amplifier OPA3 abruptly produces a positive output signal which will enable the detection of the fact that the level of the input signal is lower than a predetermined value. The circuit SS2 is identical with the circuit SS1.

Figure 39B:
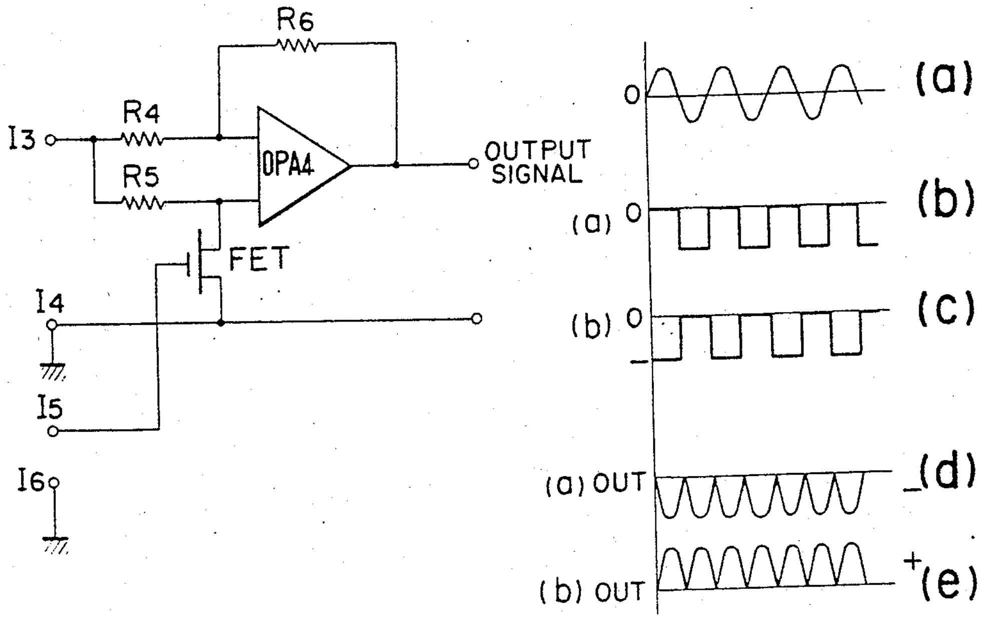

FIG. 39(B) illustrates a specific example of the phase detector circuit PD1–PD4 applicable to the electric circuit of FIG. 32A. The circuit of FIG. 39(B) includes input terminals $I_3$ and $I_4$, input terminals $I_5$ and $I_6$ for reference phase control signals, fixed resistors R3, R4 and R5, operation amplifier circuit OPA4 and field effect transistor FET. A signal as shown at (a) in FIG. 39(B) and a control signal as shown at (b) or (c) are simultaneously applied to the input terminals $I_3$ and $I_4$. When the signal shown at (b) is applied, the operation amplifier OPA4 produces such an output signal as shown at (d). When the signal shown at (c) is applied, the operation amplifier OPA4 produces such an output signal as shown at (e).

Figure 39C:
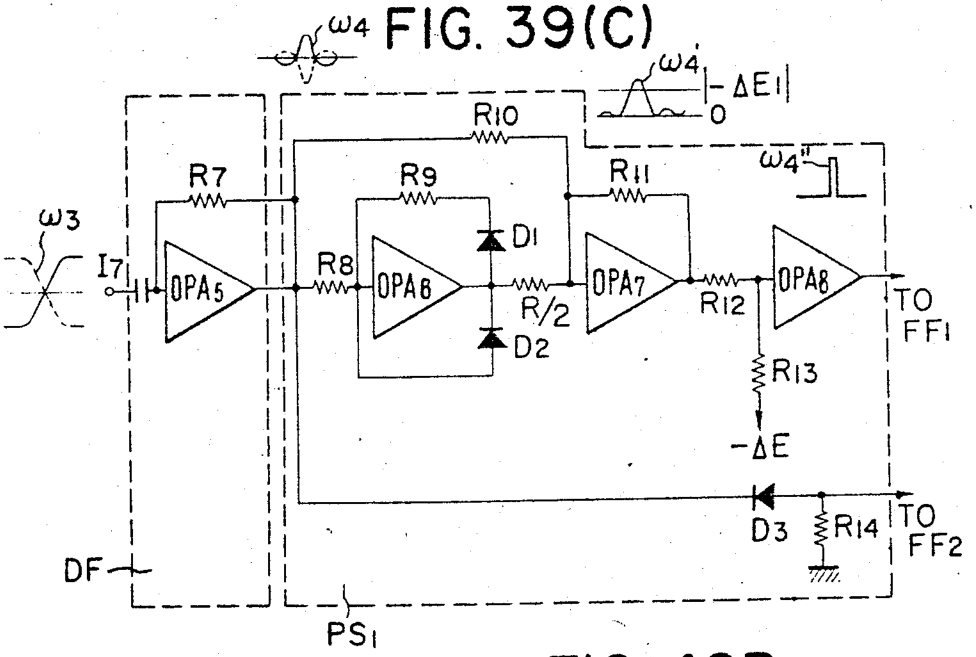

FIG. 39(C) shows a specific example of the peak sensor circuit PS1 applicable to the electric circuit of FIG. 32A. It includes operation amplifier circuits OPA5–OPA8, resistors R7–R14 and diodes D1–D3. When the input signal W3 is applied to the input terminal $I_7$, the output signal from the differentiation circuit DF assumes the waveform as shown at W4 and is applied to the peak sensor circuit PS1. The circuit comprising operation amplifiers OPA6, OPA7 and OPA8 is operable in the same manner as the aforesaid signal detector circuit SS. Thus, when the output W4' of the amplifier OPA7 is greater than the bias level $-\Delta E$ of the amplifier OPA8, the amplifier circuit OPA8 produces a pulse signal W4'', thereby setting the flip-flop FF1.

In the circuit of FIG. 32A, successive operations take place as follows: When the wafer $Wf$ is placed on the support table 1001 with the referential pattern thereof being deviated by $\delta y$ from the reference pattern 1011 on the photomask 1009, as mentioned previously, the switch $S_0$ is closed to energize the time circuit T1 for time-counting operation and the wafer support table is slightly moved in Y-direction until it is stopped in response to the detection of the direction of change and magnitude of the signal when $\delta y$ becomes zero, and at the same time the positive or negative sign of the light-and-shade contrast between the referential pattern and the rest of wafer $Wf$ is detected; in a normal case, i.e., where the wafer's referential pattern is black and the rest is light, the flip-flop FF2 is set, whereas if the contrast in reverse, the flip-flop FF2 is maintained in its reset position, whereby the contrast of the wafer's referential pattern is by the memorized position of the flip-flop FF2; in order that the magnitude of the scanning fundamental wave signal component W2 corresponding to the value of the X-directional deviation obtained by the photoelectric converter element 1018 may be utilized as an X-directional deviation discriminating control signal, the flip-flop FF1 applied a control signal to the phase detector PD2, whereby the wafer is prevented from being moved in the direction opposite to the direction for the wafer positioning because of the reversal of the contrast, and the wafer is roughly positioned in accordance with the magnitude and phase of the signal $f_1$; thereafter the wafer is further moved slightly with respect to the mask in accordance with the frequency-modulated signal provided by the radial lines of the referential pattern PR and reference pattern 1011 in accordance with the deviation existing therebetween. Thus, the wafer once roughly positioned in accordance with the signal $f_1$ is further finely positioned in accordance with the frequency-modulated signal.

The less accuracy of positioning by the magnitude and phase of the signal $f_1$ is attributable to the fact that the illuminating lamp 1013 is variable in intensity of illumination and that when the wafer $Wf$ and mask 1009 are illuminated by this lamp 1013 the partial difference in reflection factor between the wafer and mask surfaces may cause a signal $f_1$ corresponding to a false deviation to be mixed with proper signal to thereby hamper a high accuracy of positioning. On the other hand, the frequency modulation system has a disadvantage of a limited detection range, and more advantageously it may be combined with the amplitude modulation system to compensate for such disadvantage. Frequency-modulated signals have their frequency variations purely correlated with the relative deviation between the wafer and the mask, so that they are very effective as signals for a very high accuracy of positioning.

However, the method using the amplitude of the fundamental frequency component has a merit in that it is effective for a wide range of deviation up to the extent where the wafer and mask patterns are in tangential contact, i.e., up to the sum of their radii, whereas the frequency modulation system has a demerit in that a proper control signal cannot be provided when the radial line patterns for forming the frequency components $f_2$ and $f_3$ are overlapped with each other to create interference therebetween, and thus this latter system is narrower in its effective range than the former method. The present invention utilizes a combination of the merits of these two system to thereby provide an accurate control effective for a wider range of deviation.

We claim:

1. A positioning device for setting an article in a predetermined position comprising a combination of:

an article to be positioned having a referential pattern of predetermined shape formed on a surface thereof;

reference pattern carrier means having a reference pattern whose base portion is substantially similar in shape to said referential pattern;

means for moving said article in a plane and to a position where said referential pattern on said article and at least the base portion of said reference pattern are optically superposed one upon the other;

optical means for optically superposing said referential pattern and said reference pattern one upon the other and forming the images thereof;

photoelectric converter means for scanning the superposed images formed by said optical means and converting such images into electrical signals; and detector means associated with said photoelectric converter means to detect the extent of deviation between said referential pattern and said reference pattern in accordance with the output components of said photoelectric converter means.

2. A positioning device according to claim 1, wherein said referential pattern and said reference pattern are similar in shape and substantially circular.

3. A positioning device according to claim 1, wherein said referential pattern comprises a base portion of substantially circular pattern and a plurality of radial lines extending radially outwardly from said base portion.

4. A positioning device according to claim 1, wherein said referential pattern comprises a base portion of substantially circular pattern and a plurality of radial lines extending radially outwardly from said base portion, and said reference pattern comprises a base portion of substantially circular pattern and a plurality of radial lines extending radially outwardly from said base portion, the number of said latter radial lines being different from that of said former radial lines.

5. A positioning device according to claim 2, wherein said photoelectric converter means includes a photoelectric converter member and scanning means for rotatively scanning at least a circumferential portion of the superposed images of said referential pattern and said reference pattern, the scanning light from said scanning means being directed to said photoelectric converter member.

6. A positioning device according to claim 5, wherein said scanning means comprises a slitted plate rotatable at a constant speed.

7. A positioning device according to claim 5, wherein said scanning means comprises a fibrous bundle rotatable at a constant speed, one end of said bundle being opposed to said photoelectric converter member while the other end being opposed to at least a circumferential edge portion of the superposed images of said referential and reference patterns, said bundle being rotated about said one end thereof opposed to said photoelectric converter member.

8. A positioning device according to claim 5, wherein said scanning means comprises a rotatable prism.

9. A positioning device according to claim 2, wherein said photoelectric converter means comprises a photoelectric converter member and scanning means for rotatively scanning at least a circumferential edge portion of the superposed images of said referential and reference patterns, the scanning light from said scanning means being directed to said photoelectric converter member, and wherein said detector means comprises means for detecting the scanning phases of said scanning means, and a detector circuit receiving the output of said photoelectric converter member to produce X- and Y-directional deviation components in accordance with said phase detector means.

10. A positioning device according to claim 9, wherein said means for moving said article to be positioned comprises a support member for supporting said article thereon and mounted for movement in a plane, and two drive motors operatively associated with said support member to drive the latter in X- and Y-directions, each of said drive motors being operatively controlled by the output from said detector circuit.

11. A positioning device according to claim 3, wherein said photoelectric converter means comprises a photoelectric converter member and scanning means for rotatively scanning the superposed images of said referential and reference patterns and the radial lines of said referential pattern, the scanning light from said scanning means being directed to said photoelectric converter member, and wherein said detector means comprises a frequency discriminator circuit electrically connected with said photoelectric converter member to discriminate between the outputs therefrom, means for detecting the scanning phases of said scanning means, and a phase discriminator circuit connected with the output of said frequency discriminator circuit to form the output therefrom into output signals of different phases corresponding to the phases of said scanning means in accordance with the output from said detector means.

12. A positioning device according to claim 11, wherein said means for moving said article to be positioned comprises a support member for supporting said article thereon and movable in a plane, and two drive motors operatively connected with said support member to drive the latter in X- and Y-directions, said motors being operatively controlled by the output from said phase discriminator circuit.

13. A positioning device according to claim 4, wherein said photoelectric converter means comprises a photoelectric converter member and scanning means for rotatively scanning the superposed images of said referential and reference patterns and the superposed portion of said radial line patterns, the images scanned by said scanning means being directed to said photoelectric converter member to form electrical signals of different modulated frequency components in accordance with said radial line portions, and wherein said detector means comprises two frequency discriminator circuits electrically connected with said photoelectric converter member to discriminate between two different frequency-modulated signals therefrom, detector means for detecting the scanning phases of said scanning means, a pair of phase discriminator circuits connected with the outputs of said discriminator circuits to form output signals for at least two different directions corresponding to the scanning phases of said scanning means in accordance with the output from said scanning means, and a pair of subtracting means for subtracting the outputs from said pair of discriminator circuits.

14. A positioning device according to claim 13, wherein said two different directions are such that one of them is perpendicular to the other.

15. A positioning device according to claim 13, wherein said means for moving said article to be positioned comprises a support member for supporting said article thereon and movable in a plane, and two drive motors operatively connected with said support member to move said support member in said two different direction corresponding to said phases, said drive motors being reversible by said subtracting circuits in accordance with the outputs therefrom to thereby move said support member.

16. A positioning device according to claim 13, wherein said means for moving said article to be positioned is mounted for movement in two different directions in a plane, and comprises a support member for supporting said article thereon and operating means for moving said member, and wherein said detector means further comprises indicator means associated with the outputs of said discriminator circuits to effect indications corresponding to the outputs therefrom.

17. An automatic positioning device for setting an article in a predetermined position comprising a combination of:

an article to be positioned having a referential pattern of predetermined shape formed on a surface thereof;

reference pattern carrier means having a reference pattern whose base portion is substantially similar in shape to said referential pattern;

means for moving said article in a plane and in at least two directions, said means being capable of moving said article to a position where said referential pattern on said article and at least the base portion of said reference pattern are optically superposed one upon the other;

optical means for optically superposing said referential pattern and said reference pattern one upon the other and forming the images thereof;

photoelectric converter means for scanning the superposed images formed by said optical means and converting such images into electrical signals;

means connected with said photoelectric converter means to detect and memorize the polarity of the contrast of said referential pattern;

detector means connected with said photoelectric converter means and with said memorizing means to regulate and detect the extent of deviation between said referential pattern and said reference pattern in two different directions in synchronism with the scanning phases of said photoelectric converter means; and drive means connected with said detector means to drive said means for moving said article.

18. An automatic positioning device according to claim 17, wherein said memorizing means comprises a flip-flop.

19. An automatic positioning device for setting an article in a predetermined position comprising a combination of:

an article to be positioned having a referential pattern of predetermined shape formed on a surface thereof;

reference pattern carrier means having a reference pattern whose base portion is substantially similar in shape to said referential pattern, at least one of said referential pattern and said reference pattern being formed with a plurality of radial lines;

means for moving said article in a plane and in at least two directions, said means being capable of moving said article to a position where said referential pattern on said article and at least the base portion of said reference pattern are optically superposed one upon the other;

optical means for optically superposing said referential pattern and said reference pattern one upon the other and forming the images thereof;

photoelectric converter means for scanning the superposed images formed by said optical means and converting such images into electrical signals;

detector means including an amplitude detector circuit and a frequency detector circuit both connected with said photoelectric converter means, and switching means for selectively changing over said two circuits; and drive means connected with said detector means to drive said means for moving said article.

20. An automatic positioning device according to claim 19, wherein said detector means includes a second amplitude detector circuit connected with said amplitude detector circuit to detect any amplitude value thereof below a predetermined value, and a control circuit for operating said switching means in accordance with the output from said second amplitude detector circuit to disconnect said amplitude detector circuit from said photoelectric converter means and connect said frequency detector circuit with the latter means.

21. An automatic positioning device according to claim 19, wherein said detector means comprises a flipflop.

* * * * *